United States Patent
Nakano et al.

(10) Patent No.: US 9,564,779 B2
(45) Date of Patent: Feb. 7, 2017

(54) PERMANENT MAGNET MOTOR

(75) Inventors: Masatsugu Nakano, Chiyoda-ku (JP); Satoru Akutsu, Chiyoda-ku (JP); Yoshihito Asao, Chiyoda-ku (JP); Yuji Takizawa, Chiyoda-ku (JP); Yu Hirotani, Chiyoda-ku (JP); Ryuichi Takiguchi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 315 days.

(21) Appl. No.: 14/234,178

(22) PCT Filed: Oct. 14, 2011

(86) PCT No.: PCT/JP2011/073664
§ 371 (c)(1),
(2), (4) Date: Jan. 22, 2014

(87) PCT Pub. No.: WO2013/054439
PCT Pub. Date: Apr. 18, 2013

(65) Prior Publication Data
US 2014/0145547 A1    May 29, 2014

(51) Int. Cl.
*H02K 3/00*      (2006.01)
*H02K 1/16*      (2006.01)
(Continued)

(52) U.S. Cl.
CPC ............... *H02K 1/165* (2013.01); *H02K 3/28* (2013.01); *H02K 21/16* (2013.01); *H02K 29/03* (2013.01);
(Continued)

(58) Field of Classification Search
CPC .... H02K 3/12; H02K 1/2773; H02K 2213/03; H02K 3/28; H02K 3/18
(Continued)

(56) References Cited

U.S. PATENT DOCUMENTS

| 5,162,686 | A | | 11/1992 | Royer | |
|---|---|---|---|---|---|
| 5,378,953 | A | * | 1/1995 | Uchida | H02K 21/14 310/156.57 |

(Continued)

FOREIGN PATENT DOCUMENTS

| CN | 101795041 A | 8/2010 |
|---|---|---|
| CN | 201774425 U | 3/2011 |

(Continued)

OTHER PUBLICATIONS

Communication dated Oct. 16, 2015 from the Intellectual Property Office of the P.R. of China issued in corresponding application No. 201180074083.3.

(Continued)

*Primary Examiner* — Hanh Nguyen
(74) *Attorney, Agent, or Firm* — Sughrue Mion, PLLC; Richard C. Turner

(57) ABSTRACT

Provided is a permanent magnet motor that realizes reduction of both cogging torque and torque ripple, and also downsizing and weight reduction together with torque ripple reduction. When two sets of three-phase armature windings are defined such that a first armature winding 30-1 corresponds to U1 phase, V1 phase, and W1 phase and a second armature winding 30-2 corresponds to U2 phase, V2 phase, and W2 phase, U1 phase is provided in both of any adjacent slots of a plurality of slots 27, or at least one of U1 phase and U2 phase is provided in one of any adjacent slots 27, U1 phase, V1 phase, and W1 phase are shifted by an electric angle of 20° to 40° from U2 phase, V2 phase, and W2 phase upon driving, and a slot opening width Ws of a stator iron core 22 is set to satisfy $Ws/(2\pi Rs/Ns) \leq 0.15$, where Rs is an inner radius of the stator iron core and Ns is a slot number of the stator iron core.

13 Claims, 13 Drawing Sheets

(51) Int. Cl.
  H02K 21/16 (2006.01)
  H02K 29/03 (2006.01)
  H02K 3/28 (2006.01)
  H02K 1/27 (2006.01)

(52) U.S. Cl.
  CPC ............ *H02K 1/278* (2013.01); *H02K 1/2773* (2013.01); *H02K 2213/03* (2013.01)

(58) Field of Classification Search
  USPC .................................................. 310/179, 184
  See application file for complete search history.

(56) References Cited

U.S. PATENT DOCUMENTS

| | | | |
|---|---|---|---|
| 8,299,674 B2* | 10/2012 | Tanaka | H02K 3/28 310/179 |
| 2002/0047435 A1 | 4/2002 | Takahashi et al. | |
| 2003/0033709 A1* | 2/2003 | Bradfield | H02K 15/0018 29/596 |
| 2009/0072647 A1* | 3/2009 | Hino | B60L 3/0061 310/156.15 |
| 2010/0148612 A1 | 6/2010 | Takemoto et al. | |
| 2010/0289370 A1 | 11/2010 | Roth et al. | |
| 2010/0289372 A1 | 11/2010 | Taniguchi et al. | |
| 2010/0295403 A1 | 11/2010 | Morita et al. | |
| 2012/0139372 A1* | 6/2012 | Nakano | H02K 1/148 310/83 |
| 2012/0139380 A1* | 6/2012 | Taniguchi | H02K 1/2746 310/156.48 |
| 2013/0313938 A1* | 11/2013 | Yamada | H02K 1/2713 310/156.69 |

FOREIGN PATENT DOCUMENTS

| | | |
|---|---|---|
| JP | 62-137272 A | 6/1987 |
| JP | 05-344668 A | 12/1993 |
| JP | 07-264822 A | 10/1995 |
| JP | 11-98728 A | 4/1999 |
| JP | 2001-54271 A | 2/2001 |
| JP | 2001-339919 A | 12/2001 |
| JP | 2004-80944 A | 3/2004 |
| JP | 2004-088905 A | 3/2004 |
| JP | 2005-245146 A | 9/2005 |
| JP | 2007-336624 A | 12/2007 |
| JP | 2008-199894 A | 8/2008 |
| JP | 2010-531130 A | 9/2010 |
| JP | 2010-263763 A | 11/2010 |
| JP | 2010-268597 A | 11/2010 |
| JP | 2010-284025 A | 12/2010 |
| JP | 2011-4583 A | 1/2011 |
| WO | 2011/062064 A1 | 5/2011 |

OTHER PUBLICATIONS

International Search Report of PCT/JP2011/073664 dated Jan. 17, 2012.
Communication dated Mar. 25, 2015, issued by the Japanese Patent Office in counterpart Japanese application No. 2013-538410.
English Machine Translation of JP 2010-268597 A (of record).
Japanese Office Action issued Jun. 24, 2014; Patent Application No. 2013-538410.
Communication dated Feb. 8, 2016 from the European Patent Office in counterpart application No. 11873954.9.
Communication dated Jan. 26, 2016 from the Japanese Patent Office in counterpart application No. 2015-019908.
Japanese Office Action (Appeal Decision) issued Feb. 16, 2016; JP Application No. 2013-538410.

* cited by examiner

PERMANENT MAGNET MOTOR

CROSS REFERENCE TO RELATED APPLICATION

This is a National Stage of Application No. PCT/JP2011/073664 filed Oct. 14, 2011, the contents of all of which is incorporated herein by reference in its entirety.

TECHNICAL FIELD

The present invention relates to a permanent magnet motor, and particularly, to a motor used in an electric power steering apparatus for vehicle.

BACKGROUND ART

Conventionally, for example, as shown in Patent Document 1, a structure of a permanent magnet motor has been devised in which a first three-phase stator winding and a second three-phase stator winding are provided.

In addition, Patent Document 2 discloses a rotary electric machine having a first three-phase winding and a second three-phase winding, in which the first three-phase winding and the second three-phase winding have a phase difference from each other by $\pi/6$.

CITATION LIST

Patent Document

Patent Document 1: Japanese Laid-Open Patent Publication No. 7-264822
Patent Document 2: Japanese Laid-Open Patent Publication No. 2010-268597

SUMMARY OF THE INVENTION

Problems to be Solved by the Invention

However, the structures of Patent Document 1 and Patent Document 2 have a problem, due to their large slot opening widths, that such a structure is very likely to be influenced by work error on the rotor side or variation in the shape or the magnetic characteristic of a permanent magnet, whereby cogging torque increases.

Therefore, there is a problem that such a motor is not suitable for use having high demand for reduction of cogging torque, for example, use in an electric power steering apparatus for vehicle.

The present invention has been made to solve the above problems, and an object of the present invention is to provide a permanent magnet motor that realizes both reduction of cogging torque and reduction of torque ripple and also realizes downsizing and weight reduction together with reduction of torque ripple.

Solution to the Problems

The present invention is a permanent magnet motor including: a rotor including a rotor iron core and a plurality of permanent magnets provided to the rotor iron core; and a stator including a stator iron core having a plurality of teeth, and two sets of three-phase armature windings provided in a plurality of slots formed in the stator iron core, a first armature winding being supplied with current from a first inverter and a second armature winding being supplied with current from a second inverter, wherein in the case where the two sets of three-phase armature windings are defined such that the first armature winding corresponds to U1 phase, V1 phase, and W1 phase and the second armature winding corresponds to U2 phase, V2 phase, and W2 phase, the U1 phase of the first armature winding is provided in both slots of any one pair of adjacent slots of the plurality of slots, or at least one of the U1 phase of the first armature winding and the U2 phase of the second armature winding is provided in one slot of any one pair of adjacent slots of the plurality of slots, the U1 phase, the V1 phase, and the W1 phase of the first armature winding are shifted by an electric angle of 20° to 40° from the U2 phase, the V2 phase, and the W2 phase of the second armature winding upon driving, and a slot opening width Ws of the stator iron core is set so as to satisfy $Ws/(2\pi Rs/Ns) \leq 0.15$, where Rs is an inner radius of the stator iron core and Ns is a slot number of the stator iron core.

Effect of the Invention

According to the present invention, it becomes possible to obtain a permanent magnet motor that realizes both reduction of cogging torque and reduction of torque ripple and also realizes downsizing and weight reduction together with reduction of torque ripple, and particularly, to realize a permanent magnet motor with a small size, high efficiency, low vibration, and low noise in which a 6-th order torque ripple caused by magnetic saturation of a stator iron core is small even if a slot opening width of the stator is small.

DESCRIPTION OF EMBODIMENTS

Hereinafter, preferred embodiments of a permanent magnet motor for electric power steering of the present invention will be described with reference to the drawings.

Embodiment 1

Figure 1:
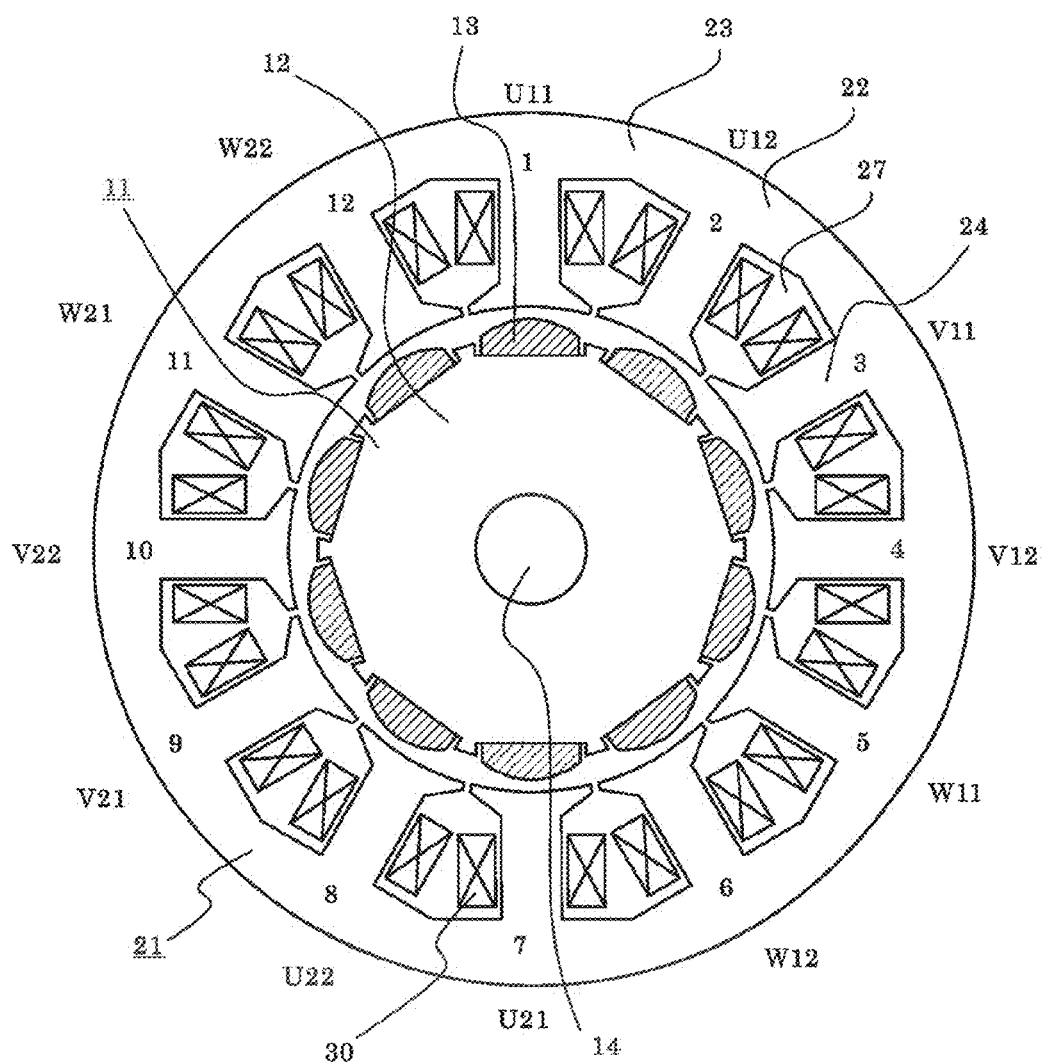
FIG. 1 is a sectional view showing a permanent magnet motor of embodiment 1 of the present invention.

FIG. 1 is a sectional view of a permanent magnet motor 10 of embodiment 1, showing an example of 10 poles and 12 slots.

A rotor 11 is provided in a rotatable state inside a stator 21, and includes a shaft 14, a rotor iron core 12 provided outside the shaft 14, and ten permanent magnets 13 provided at regular intervals around the outer circumference of the rotor iron core 12.

The stator 21 includes a ring-shaped core back 23, a total of twelve teeth 24 extending radially inward from the core back 23, a stator iron core 22 in which a slot 27 is provided between the adjacent two teeth 24, and an armature winding 30 wound on each tooth 24 in a concentrated manner.

It is noted that in FIG. 1, for the purpose of simplification, an insulator provided between the armature winding 30 and the stator iron core 22, and a frame provided on the outer circumference of the stator iron core 22 are not shown.

In addition, for convenience sake, numbers of 1 to 12 are assigned to the teeth 24. Further, for convenience sake, numbers are assigned to the armature windings (hereinafter, may be referred to as coils) 30 wound on the respective teeth 24 in a concentrated manner, in order to identify three phases of U, V, and W of the coils.

The phases of U, V, and W include four U phases of U11, U12, U21, and U22, four V phases of V11, V12, V21, and V22, and four W phases of W11, W12, W21, and W22. As shown in FIG. 1, the coils are arranged in the order, U11, U12, V11, V12, W11, W12, U21, U22, V21, V22, W21, and W22, which respectively correspond to the teeth 24-1 to 24-12.

In addition, regarding the winding directions of the windings, U11 and U12 are opposite to each other, U21 and U22 are opposite to each other, V11 and V12 are opposite to each other, V21 and V22 are opposite to each other, W11 and W12 are opposite to each other, and W21 and W22 are opposite to each other.

Figure 13:
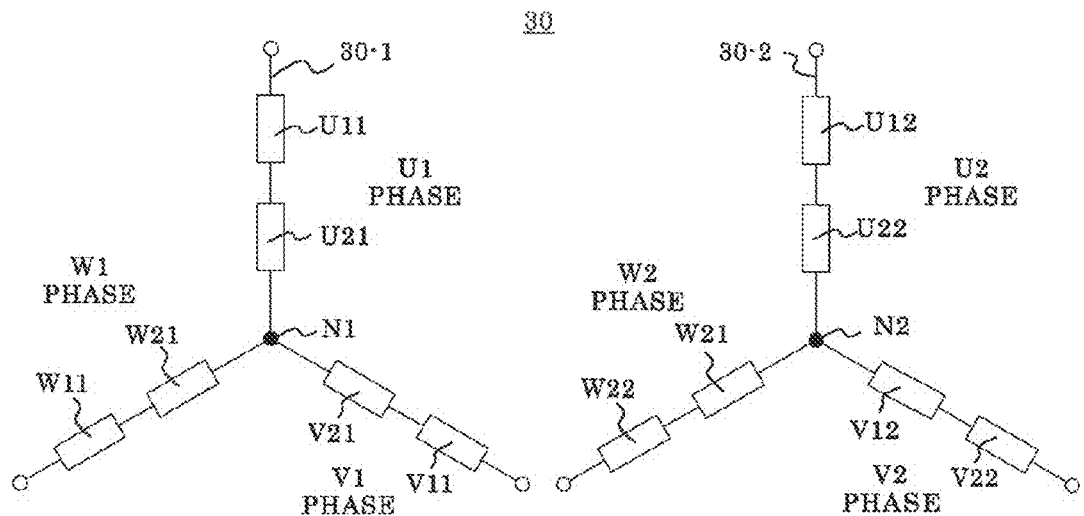
FIG. 13 is an explanation diagram showing a wire connection example of armature windings of the permanent magnet motor of embodiment 1.

Among the above coils, as shown in FIG. 13, the coils U10 and U21 are connected in series to form a coil for U1 phase, the coils V11 and V21 are connected in series to form a coil for V1 phase, and the coils W1 and W21 are connected in series to form a coil for W1 phase, and these three coils are connected in a Y-connection fashion with a neutral point of N1, to form a first armature winding 30-1.

In addition, the coils U12 and U22 are connected in series to form a coil for U2 phase, the coils V12 and V22 are connected in series to form a coil for V2 phase, and the coils W12 and W22 are connected in series to form a coil for W2 phase, and these three coils are connected in a Y-connection fashion with a neutral point of N2, to form a second armature winding 30-2.

Next, a drive circuit will be described.

Figure 4:
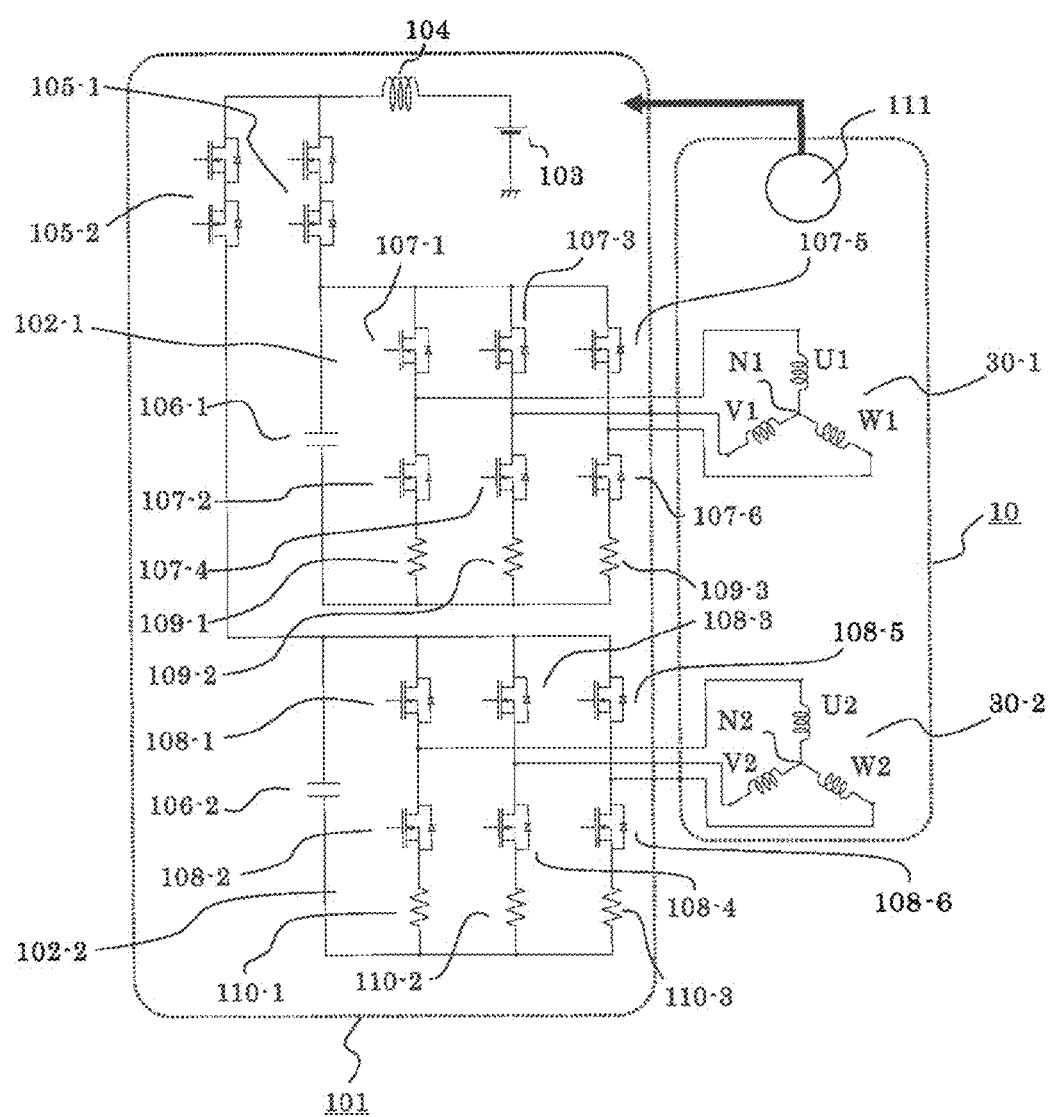
FIG. 4 is a circuit configuration diagram showing a drive circuit of the permanent magnet motor of embodiment 1.

FIG. 4 is a circuit configuration diagram including a motor 10 and an ECU 101 according to embodiment 1.

The motor 10 is the permanent magnet motor 10 with 10 poles and 12 slots shown in FIG. 1.

In FIG. 4, for the purpose of simplification, the details are not shown and only the armature windings 30 of the motor 10 are shown.

The armature windings 30 of the motor 10 are composed of the first armature winding 30-1 including the first U-phase winding U1, the first V-phase winding V1, and the first W-phase winding W1, and the second armature winding 30-2 including the second U-phase winding U2, the second V-phase winding V2, and the second W-phase winding W2.

Also in the ECU 101, the details are not shown for the purpose of simplification, and only a power circuit section of an inverter is shown.

The ECU 101 is composed of two inverters 102, and the respective inverters 102-1 and 102-2 supply three-phase currents to the first and second armature windings 30-1 and 30-2.

The ECU 101 is supplied with DC power from a power supply 103 such as a battery, to which a power supply relay 105 is connected via a coil 104 for removing noise.

In FIG. 4, the power supply 103 appears to be present inside the ECU 101, but actually, power is supplied via a connector from an external power supply such as a battery.

The power supply relay 105 includes two power supply relays 105-1 and 105-2 each composed of two MOS-FETs. Upon failure or the like, the power supply relay 105 is opened to prevent excessive current from flowing.

It is noted that although the power supply 103, the coil 104, and the power supply relay 105 are connected in this order in FIG. 4, as a matter of course, the power supply relay 105 may be provided closer to the power supply 103 than the coil 104 is.

A capacitor 106-1 and a capacitor 106-2 are smoothing capacitors. Although each of them is composed of one capacitor in FIG. 4, as a matter of course, each of them may be composed of a plurality of capacitors connected in parallel.

The inverter 102- and the inverter 102-2 are each composed of a bridge using six MOS-FETs. In the inverter 102-1, a MOS-FET 107-1 and a MOS-FET 107-2 are connected in series, a MOS-FET 107-3 and a MOS-FET 107-4 are connected in series, and a MOS-FET 107-5 and a MOS-FET 107-6 are connected in series, and the three pairs of MOS-FETs are connected in parallel.

Further, one shunt resistor is connected to the GND (ground) side of each of the three lower-side MOS-FETs 107-2, 107-4, and 107-6, and the shunt resistors are represented as a shunt 109-1, a shunt 109-2, and a shunt 109-3, respectively. These shunt resistors are used for detection of a current value.

It is noted that although an example of using three shunts is shown, current detection can be performed even by two shunts or one shunt, and therefore, as a matter of course, such a configuration may be employed.

Regarding current supply to the motor 10 side, as shown in FIG. 4, current is supplied from between the MOS-FETs 107-1 and 107-2 through a bus bar or the like to U1 phase of the motor 10, current is supplied from between the MOS-FETs 107-3 and 107-4 through a bus bar or the like to V1 phase of the motor 10, and current is supplied from between the MOS-FETs 107-5 and 107-6 through a bus bar or the like to W1 phase of the motor 10.

The inverter 102-2 also has the same configuration. In the inverter 102-2, a MOS-FET 108-1 and a MOS-FET 108-2 are connected in series, a MOS-FET 108-3 and a MOS-FET 108-4 are connected in series, and a MOS-FET 108-5 and a MOS-FET 108-6 are connected in series, and the three pairs of MOS-FETs are connected in parallel.

Further, one shunt resistor is connected to the GND (ground) side of each of the three lower-side MOS-FETs 108-2, 108-4, and 108-6, and the shunt resistors are represented as a shunt 110-1, a shunt 110-2, and a shunt 110-3, respectively.

These shunt resistors are used for detection of a current value. It is noted that although an example of using three shunts is shown, current detection can be performed even by two shunts or one shunt, and therefore, as a matter of course, such a configuration may be employed.

Regarding current supply to the motor 10 side, as shown in FIG. 4, current is supplied from between the MOS-FETs 108-1 and 108-2 through a bus bar or the like to U2 phase of the motor 10, current is supplied from between the MOS-FETs 108-3 and 108-4 through a bus bar or the like to V2 phase of the motor 10, and current is supplied from between the MOS-FETs 108-5 and 108-6 through a bus bar or the like to W2 phase of the motor 10.

The two inverters 102-1 and 102-2 perform switching by a signal sent from a control circuit (not shown) to the MOS-FETs in accordance with a rotation angle detected by a rotation angle sensor 111 provided on the motor 10, thereby supplying desired three-phase currents to the first and second armature windings 30-1 and 30-2, respectively.

It is noted that a resolver, a GMR sensor, an MR sensor, or the like are used as the rotation angle sensor 111.

Figure 12:
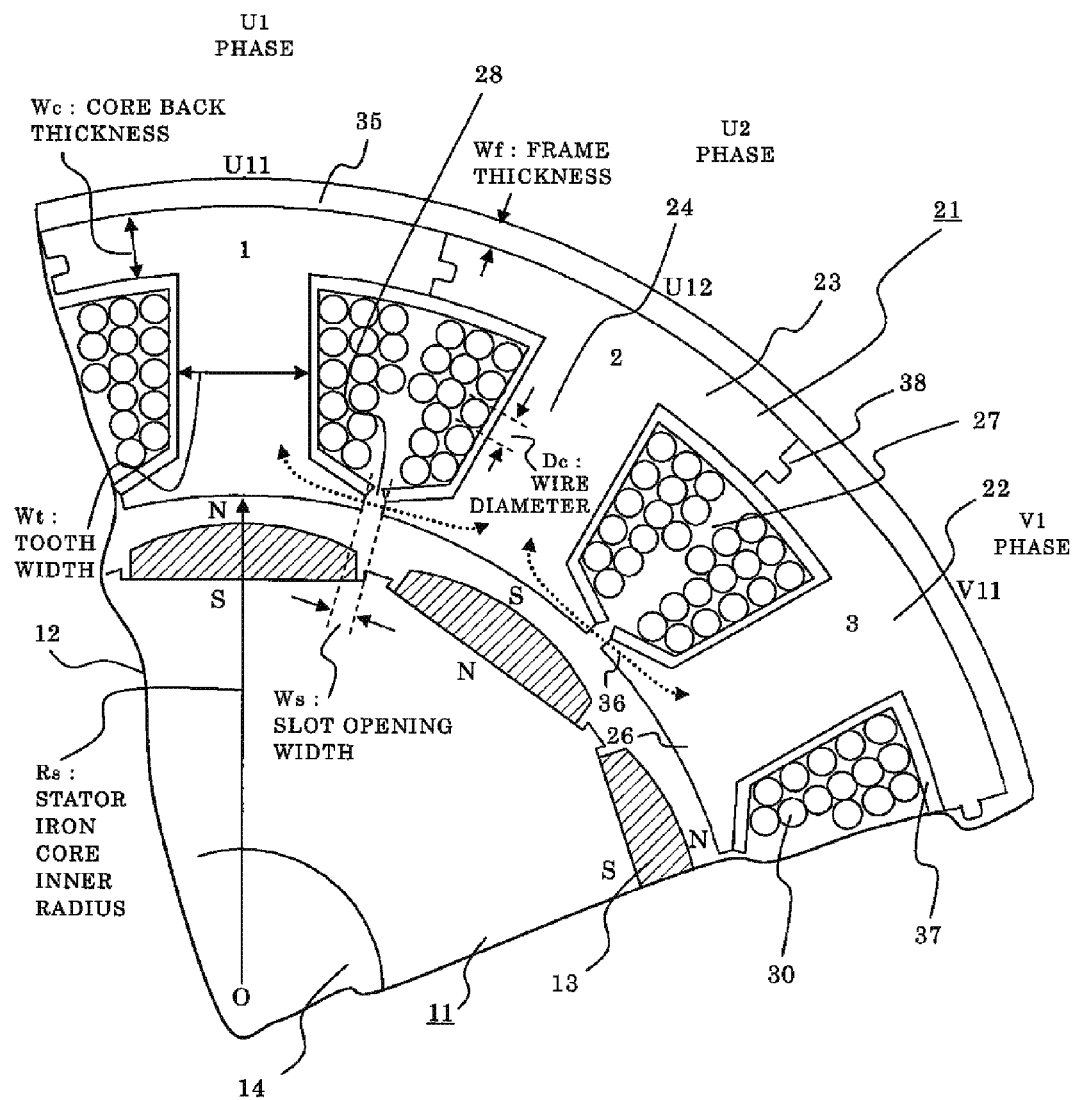
FIG. 12 is a specific part sectional view showing a slot opening portion of the permanent magnet motor of embodiment 1 and the peripheral area.

FIG. 12 is a specific part sectional view showing a slot opening portion 28 of the stator iron core 22 and an area peripheral to the slot opening portion. For the purpose of simplification, only three of the teeth 24 and the permanent magnets 13 for three magnetic poles are shown.

The stator iron core 22 includes the teeth 24 extending radially inward from the ring-shaped core back 23, and a tooth end portion 26 having a shape spreading in the circumferential direction. The slot opening portion 28 is provided between the adjacent teeth 24, and the adjacent teeth 24 are joined via a joint surface 38.

A frame 35 is fixed on the outer circumference of the stator iron core 22 by press fit or shrinkage fit.

An insulator 37 for securing electrical insulation between the stator iron core 22 and the armature winding 30 is provided on a slot 27 of the stator iron core 22.

The armature winding 30 is wound on each tooth 24 in a concentrated manner.

As described above, the coils U11 and U12 are wound in directions opposite to each other and form U1 phase and U2 phase, respectively. When there is no phase difference between U1 phase and U2 phase or the phase difference is a small value such as 20° to 40°, large current flows in the two coils at the same time.

At this time, flux leakage occurs on a magnetic path 36 between the adjacent teeth 24. The leaked flux does not contribute to torque of the motor 10, but increases the magnetic flux density of the teeth 24, so that magnetic saturation occurs in the stator iron core 22, resulting in a problem that a 6-th order torque ripple (in the case where a component having an electric angle cycle of 360 degrees is defined as 1-th order) increases.

That is, in the case where the armature winding 30 for at least one of U1 phase and U2 phase is provided in both of the adjacent slots 27 of the stator iron core 22, flux leakage increases, thereby causing the above problem.

In response to this, if a slot opening width Ws of the slot opening portion 28 is increased, flux leakage can be reduced. However, in the case where the slot opening width Ws is large, conventionally, there is a problem that pulsation of permeance increases, and influences of shape error on the rotor 11 side and variations in the shape and the magnetic characteristic of the permanent magnet 13 become large, whereby cogging torque whose order number coincides with a slot number Ns increases.

Therefore, conventional techniques cannot realize both reduction of cogging torque whose order number per one revolution coincides with the slot number Ns and reduction of the 6-th order torque ripple.

Figure 5:
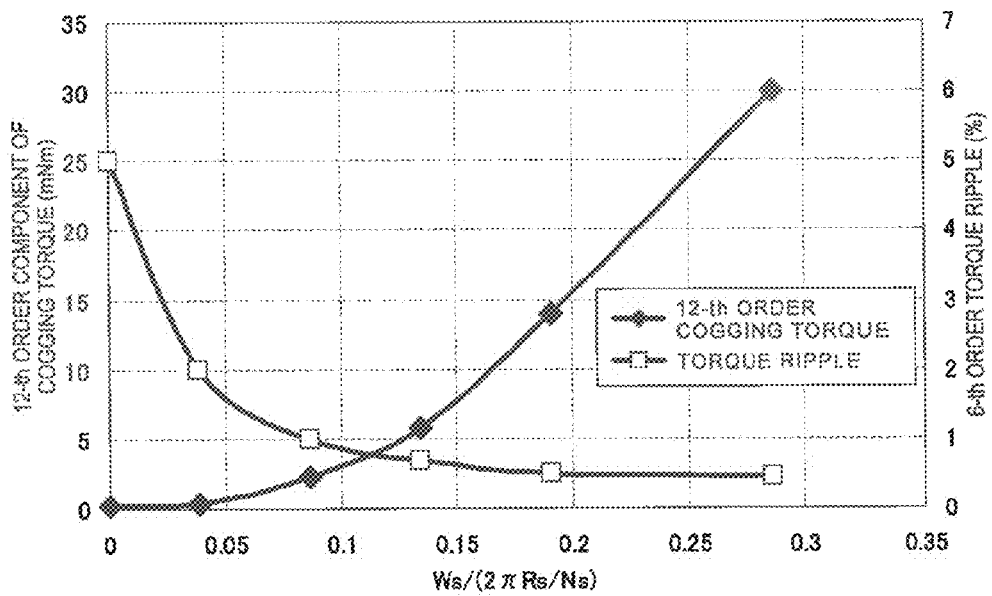
FIG. 5 is an explanation diagram showing the relationship between torque ripple and cogging torque of a conventional permanent magnet motor.

FIG. 5 is a diagram showing the relationship among the slot opening width, cogging torque, and torque ripple in a conventional permanent magnet motor.

The horizontal axis indicates a parameter obtained by standardizing the slot opening width We by a slot pitch. The slot pitch is a value obtained by dividing the length of the circumference of a circle having a radius equal to a stator inner radius Rs, by the slot number Ns. That is, the parameter is $Ws/(2\pi Rs/Ns)$.

As the slot opening width We increases, the 12-th order cogging torque (Ns=12) rapidly increases.

On the other hand, the torque ripple increases as the slot opening width decreases. This is due to occurrence of magnetic saturation in the stator iron core 22 by an influence of flux leaked on the magnetic path 36 of the slot opening portion 28 as described above.

Figure 6:
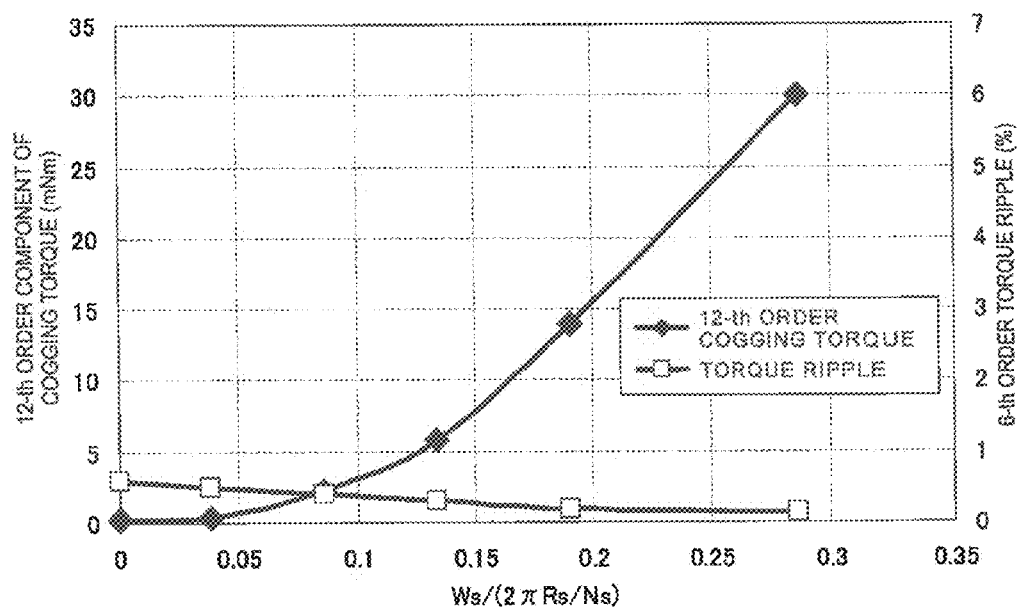
FIG. 6 is an explanation diagram showing the relationship between torque ripple and cogging torque of the permanent magnet motor of the present invention.

On the other hand, FIG. 6 shows the case where the motor 10 shown in FIG. 1 is driven by the two three-phase inverters 102-1 and 102-2 shown in FIG. 4. Cogging torque is not influenced by the drive circuit or the winding, and therefore indicates the same value as in FIG. 5. On the other hand, torque ripple is reduced in the entire region.

This is due to reduction of a 6-th order component of torque ripple caused by setting the phase difference between the first armature winding 30-1 and the second armature winding 30-2 at an electric angle of 20° to 40° or desirably, an electric angle of 30°. This phase difference may be changed in accordance with the driving state of the motor 10, or may be fixed at 30°, for example.

Particularly, in the case where the slot opening width Ws is small, an effect of reducing torque ripple is large as compared to the conventional case, and it is shown that even if magnetic saturation occurs in the stator iron core 22, the 6-th order component of torque ripple is reduced by the two three-phase inverters 102-1 and 102-2.

It is found that in the case of $Ws/(2\pi Rs/Ns) \leq 0.15$, both reduction of the Ns-th order cogging torque and reduction of the 6-th order torque ripple are realized.

Figure 7:
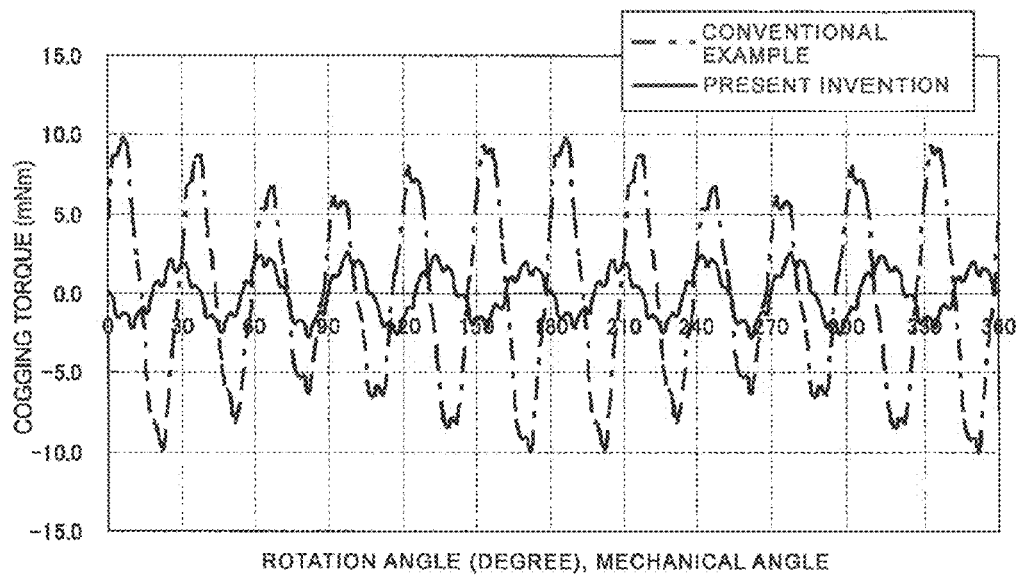
FIG. 7 is an explanation diagram showing cogging torque waveforms of the permanent magnet motor of the present invention and the conventional permanent magnet motor.

FIG. 7 shows a cogging torque waveform. The horizontal axis indicates a rotation angle (mechanical angle), and the vertical axis indicates cogging torque. In the conventional case, a large amount of the 12-th order (coinciding with the slot number Ns) cogging torque is included per one revolution, but in the present invention, the 12-th order cogging torque is small, i.e., greatly reduced.

Figure 8:
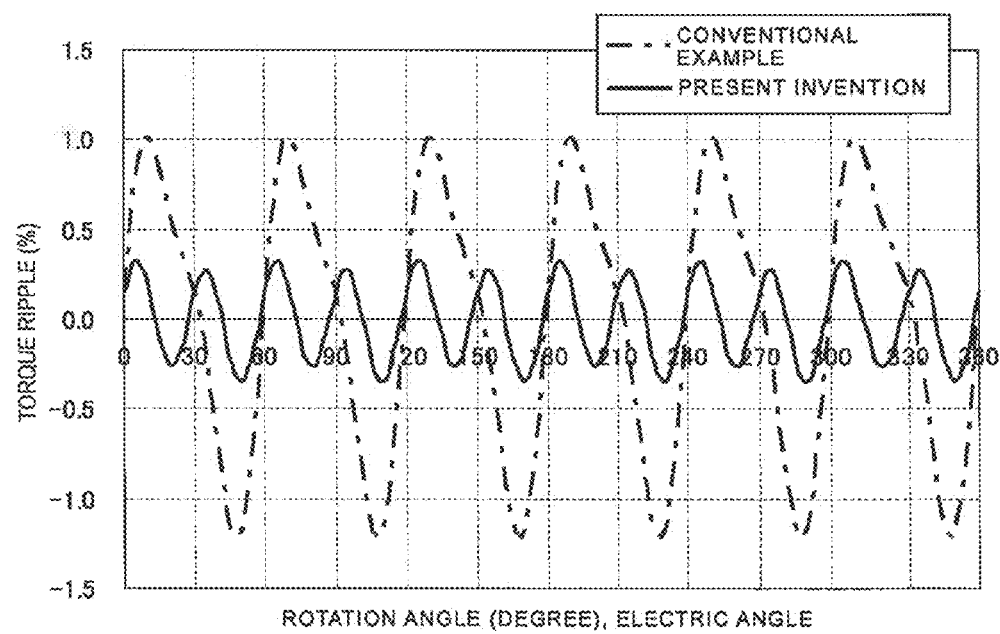
FIG. 8 is an explanation diagram showing torque ripple waveforms of the permanent magnet motor of the present invention and the conventional permanent magnet motor.

FIG. 8 shows a torque ripple waveform.

The horizontal axis indicates a rotation angle (electric angle), and the vertical axis indicates torque ripple. It is found that a component of 6-th order electric angle is greatly reduced.

In this example, the case where the armature winding 30 for at least one of U1 phase and U2 phase is provided in both of the adjacent slots 27 of the stator iron core 22, has been described. Instead of this case, also in the case where the armature winding 30 for U1 phase is provided in both of the adjacent slots 27, the same effect can be obtained.

In addition, although an example of using Y connection has been shown in FIG. 13, the same effect can be obtained also in the case of Δ connection.

Thus, according to embodiment 1, the permanent magnet motor 10 includes: the rotor 11 including the rotor iron core 12 and the plurality of permanent magnets 13 provided to the rotor iron core; and the stator 21 including the stator iron core 22 having the plurality of teeth 24, and the two sets of three-phase armature windings 30 provided in the plurality of slots 27 formed in the stator iron core, a first armature winding 30-1 being supplied with current from the first inverter 102-1 and a second armature winding 30-2 being supplied with current from the second inverter 102-2, wherein in the case where the two sets of three-phase armature windings are defined such that the first armature winding 30-1 corresponds to U1 phase, V1 phase, and W1 phase and the second armature winding 30-2 corresponds to U2 phase, V2 phase, and W2 phase, the U1 phase of the first armature winding is provided in both slots of any one pair of adjacent slots of the plurality of slots 27, the U1 phase, the V1 phase, and the W1 phase of the first armature winding are shifted by an electric angle of 20° to 40° from the U2 phase, the V2 phase, and the W2 phase of the second armature winding upon driving, and the slot opening width Ws of the stator iron core 22 is set so as to satisfy $Ws/(2\pi Rs/Ns) \leq 0.15$, where Rs is an inner radius of the stator iron core and Ns is a slot number of the stator iron core.

Owing to this configuration, it becomes possible to obtain a motor with a small size, high efficiency, low vibration, and low noise in which a 6-th order torque ripple caused by magnetic saturation of a stator iron core is small.

In addition, at the same time, an effect of realizing reduction of cogging torque whose order number coincides with the slot number, is obtained.

If the slot opening width Ws is set to be smaller than a wire diameter Dc of the coil, the coil is prevented from coming out of the coil slot 27 to the rotor 11 side, and therefore an effect of preventing the coil from entering a gap between the rotor 11 and the stator 21, is obtained.

In addition, the configuration of embodiment 1 provides an effect of allowing a tooth width and a core back thickness to be reduced to downsize the motor.

In the case where a teeth width Wt shown in FIG. 12 is small, the magnetic flux density at the teeth 24 increases, magnetic saturation occurs, and 6-th order torque ripple (in the case where a component having an electric angle cycle of degrees is defined as 1-th order) greatly increases. Particularly, such an influence is significant in the case where the slot opening width Ws is reduced to satisfy $Ws/(2\pi Rs/Ns) \leq 0.15$.

However, in the permanent magnet motor 10 having the configuration of embodiment 1, since the 6-th order torque ripple is reduced even if magnetic saturation occurs in the iron core, a sectional area of the slot 27 can be increased and armature winding resistance can be reduced, thereby providing an effect of making it possible to obtain a small-sized and high-output motor.

In the case of using a rare earth permanent magnet as the permanent magnet 13, the teeth width Wt, when reduced to the minimum, can be set in a range of $0.50 \leq Wt/(2\pi Rs/Ns) \leq 0.65$, whereby a wide slot sectional area can be secured. In the above, Rs is an inner radius of the stator iron core and Na is a slot number of the stator iron core 22.

The same applies to a core back thickness Wc. In the case where the core back thickness We is small, the magnetic flux density at the core back 23 increases, magnetic saturation occurs, 6-th order torque ripple (in the case where a component having an electric angle cycle of 360 degrees is defined as 1-th order) greatly increases.

Particularly, such an influence is significant in the case where the slot opening width Ws is reduced to satisfy $Ws/(2\pi Rs/Ns) \leq 0.15$.

However, in the permanent magnet motor 10 having the configuration of embodiment 1, since the 6-th order torque ripple is reduced even if magnetic saturation occurs in the iron core, a sectional area of the slot 27 can be increased and armature winding resistance can be reduced, thereby providing an effect of making it possible to obtain a small-sized and high-output motor.

Since the core back 23 particularly influences the diameter of the motor 10, an effect of contributing to space saving of the electric power steering apparatus is obtained.

In the case of using a rare earth permanent magnet as the permanent magnet 13, the core back thickness Wc, when reduced to the minimum, can be set in a range of $0.18 \leq Wc/(2\pi Rs/M) \leq 0.50$, whereby the outer diameter of the motor 10 can be reduced. In the above, Rs is an inner radius of the stator iron core 22 and M is a pole number.

Embodiment 2

Figure 2:
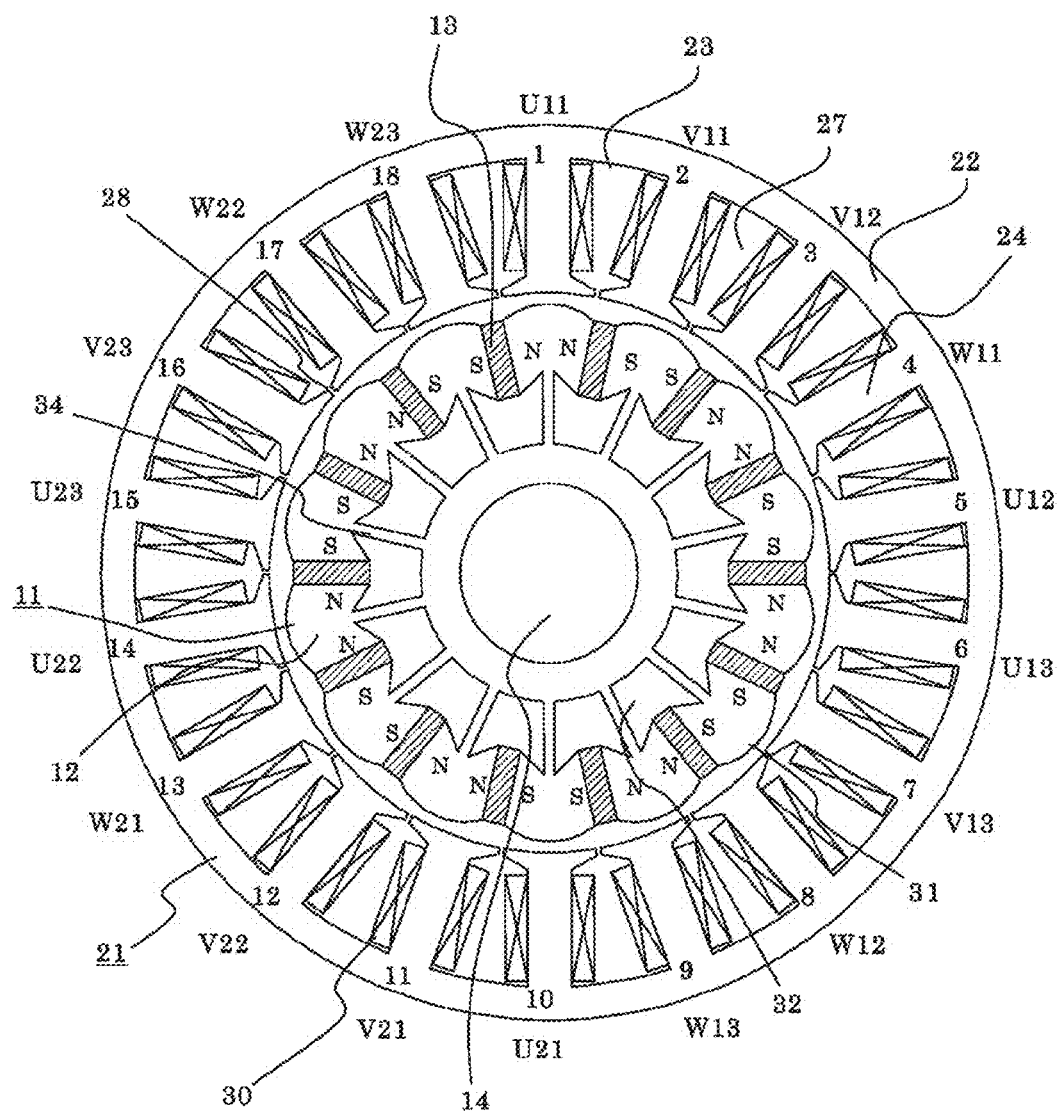
FIG. 2 is a sectional view showing a permanent magnet motor of embodiment 2 of the present invention.

FIG. 2 is a sectional view of a permanent magnet motor 10 of embodiment 2.

A stator 21 includes a ring-shaped core back 23, a total of eighteen teeth 24 extending radially inward from the core back 23, a stator iron core 22 in which a slot 27 is provided between the adjacent two teeth 24, and an armature winding 30 wound on each tooth 24 in a concentrated manner.

It is noted that in FIG. 2, for the purpose of simplification, an insulator provided between the armature winding 30 and the stator iron core 22, and a frame provided on the outer circumference of the stator iron core are not shown. In addition, for convenience sake, numbers of 1 to 18 are assigned to the teeth 24.

Further, for convenience sake, numbers are assigned to the armature windings (coils) 30 wound on the respective teeth 24 in a concentrated manner, in order to identify three phases of U, V, and W of the coils.

The phases of U, V, and W include six U phases of U11, U12, U13, U21, U22, and U23, six V phases of V11, V12, V13, V21, V22, and V23, and six W phases of W11, W12, W13, W21, W22, and W23. As shown in FIG. 1, the coils are arranged in the order, U11, V11, V12, W11, U12, U13, V13, W12, W13, U21, V21, V22, W21, U22, U23, V23, W22, and W23, which respectively correspond to the teeth 24-1 to 24-18. That is, the armature winding for at least one of U1 phase and U2 phase is provided in at least one of the adjacent slots 27 of the stator iron core 22.

U11, U12, and U13 are connected in series to form U1 phase which is a first U-phase winding, and the winding direction of the coil U12 is opposite to the winding direction of the coils U11 and U13.

U21, U22, and U23 are connected in series to form U2 phase which is a second U-phase winding, and the winding direction of the coil U22 is opposite to the winding direction of the coils U21 and U23.

V11, V12, and V13 are connected in series to form V1 phase which is a first V-phase winding, and the winding direction of the coil V12 is opposite to the winding direction of the coils V11 and V13.

V21, V22, and V23 are connected in series to form V2 phase which is a second V-phase winding, and the winding direction of the coil V22 is opposite to the winding direction of the coils V21 and V23.

W11, W12, and W13 are connected in series to form W1 phase which is a first W-phase winding, and the winding direction of the coil W12 is opposite to the winding direction of the coils W11 and W13.

W21, W22, and W23 are connected in series to form W2 phase which is a second W-phase winding, and the winding direction of the coil W22 is opposite to the winding direction of the coils W21 and W23.

Figure 14:
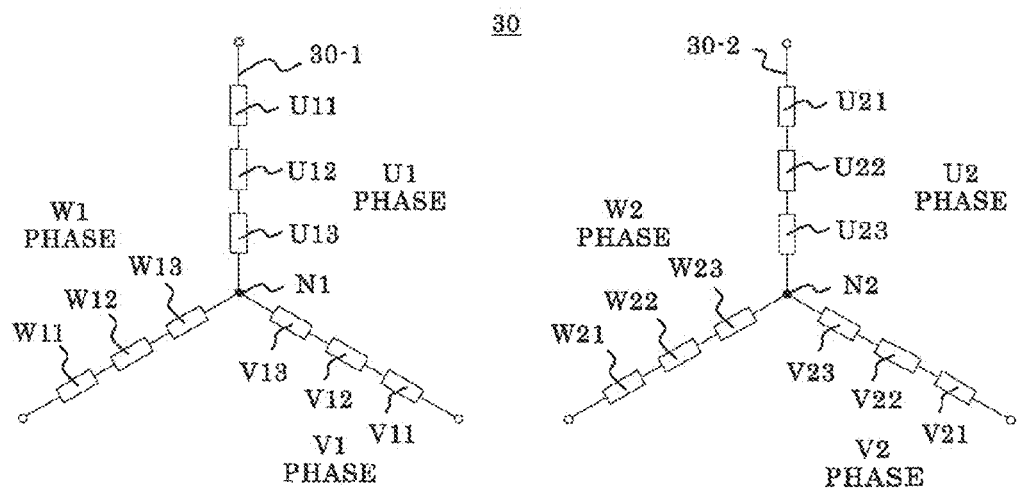
FIG. 14 is an explanation diagram showing a wire connection example of armature windings of the permanent magnet motor of embodiment 2.

FIG. 14 shows the connection manner of these eighteen coils.

Among the above coils, as shown in FIG. 14, the coils U11, U12, and U13 are connected in series to form a coil for U1 phase, the coils V11, V12, and V13 are connected in series to form a coil for V1 phase, and the coils W11, W12, and W13 are connected in series to form a coil for W1 phase, and these three coils are connected in a Y-connection fashion with a neutral point of N1, to form a first armature winding 30-1.

In addition, the coils U21, U22, and U23 are connected in series to form a coil for U2 phase, the coils V21, V22, and V23 are connected in series to form a coil for V2 phase, and the coils W21, W22, and W23 are connected in series to form a coil for W2 phase, and these three coils are connected in a Y-connection fashion with a neutral point of N2, to form a second armature winding 30-2.

In the motor 10, the pole number of the rotor 11 is and the slot number of the stator 21 is 18. The rotor 11 is provided in a rotatable state inside the stator 21. The rotor 11 includes a shaft 14 as a rotary axis, and a rotor iron core 12 provided outside the shaft 14.

A permanent magnet 13 has a shape in which the length in the radial direction is longer than the length in the circumferential direction, and fourteen such permanent magnets 13 are arranged at regular intervals in the circumferential direction. The permanent magnets 13 are magnetized in directions shown in FIG. 2 in which N and S indicate N pole and S pole, respectively.

That is, the permanent magnets 13 are magnetized such that surfaces facing to each other of the adjacent permanent magnets 13 have the same pole. By thus setting the magnetization directions, an effect of concentrating magnetic flux on the rotor iron core 12 and thereby increasing the magnetic flux density is obtained.

In addition, the rotor iron core 12 is interposed between the adjacent permanent magnets 13. The rotor iron core 12 has a curved surface portion 31 on its surface facing to the stator 21 side. The shape of the curved surface portion 31 is formed to be such a convex curved surface that the gap length from the stator 21 is shortened toward the midpoint between the adjacent permanent magnets 13.

This shape smoothens the waveform of the magnetic flux density occurring in the gap, thereby reducing cogging torque and torque ripple.

Further, a non-magnetic portion 32 is provided in contact with an end surface of the permanent magnet 13 on the inner circumferential side. This portion may be air or may be filled with resin, or a non-magnetic metal such as stainless or aluminum may be interposed in this part.

Thus, flux leakage of the permanent magnet 13 can be reduced.

A joint portion 34 is provided between the rotor iron core 12 between the adjacent permanent magnets 13 and the rotor iron core 12 provided so as to surround the outer circumference of the shaft 14. The joint portion 34 functions to mechanically join both rotor iron cores 12. Since the length in the radial direction of the joint portion 34 is longer than the length in the circumferential direction, magnetic flux is concentrated on the rotor iron core 12, whereby high torque is obtained.

Conventionally, a structure in which the permanent magnet 13 is embedded in the rotor iron core 12 has a problem that torque ripple increases and vibration noise increases as compared to the case of surface magnet type. However, by configuring the wire connections of the armature windings 30 as shown in FIG. 14, and further, by driving the armature windings by the two three-phase inverters 102-1 and 102-2 shown in FIG. 4 such that the phase difference between the first armature winding 30-1 and the second armature winding 30-2 is an electric angle of 20° to 40°, or desirably, an electric angle of 30°, the 6-th order torque ripple can be reduced.

Further, the slot opening width Ws of the stator iron core 22 is set so as to satisfy Ws/(2πRs/Ns)≤0.15, where Rs is the inner radius of the stator iron core and Ns is the slot number of the stator iron core, thus making it possible to greatly reduce cogging torque whose order number coincides with Ns and reduce the 6-th order torque ripple even if magnetic saturation occurs in the stator iron core 22 due to flux leakage.

Further, in the case of 14 poles and 18 slots, an electromagnetic excitation force having a second spatial order can be reduced, whereby vibration and noise are reduced. That is, both increase in torque and reduction in vibration and noise can be realized. Besides the example shown in FIG. 2, if the pole number M is 18n±4n and the slot number Ns is 18n (n is an integer), the same effect is obtained.

Embodiment 3

Figure 3:
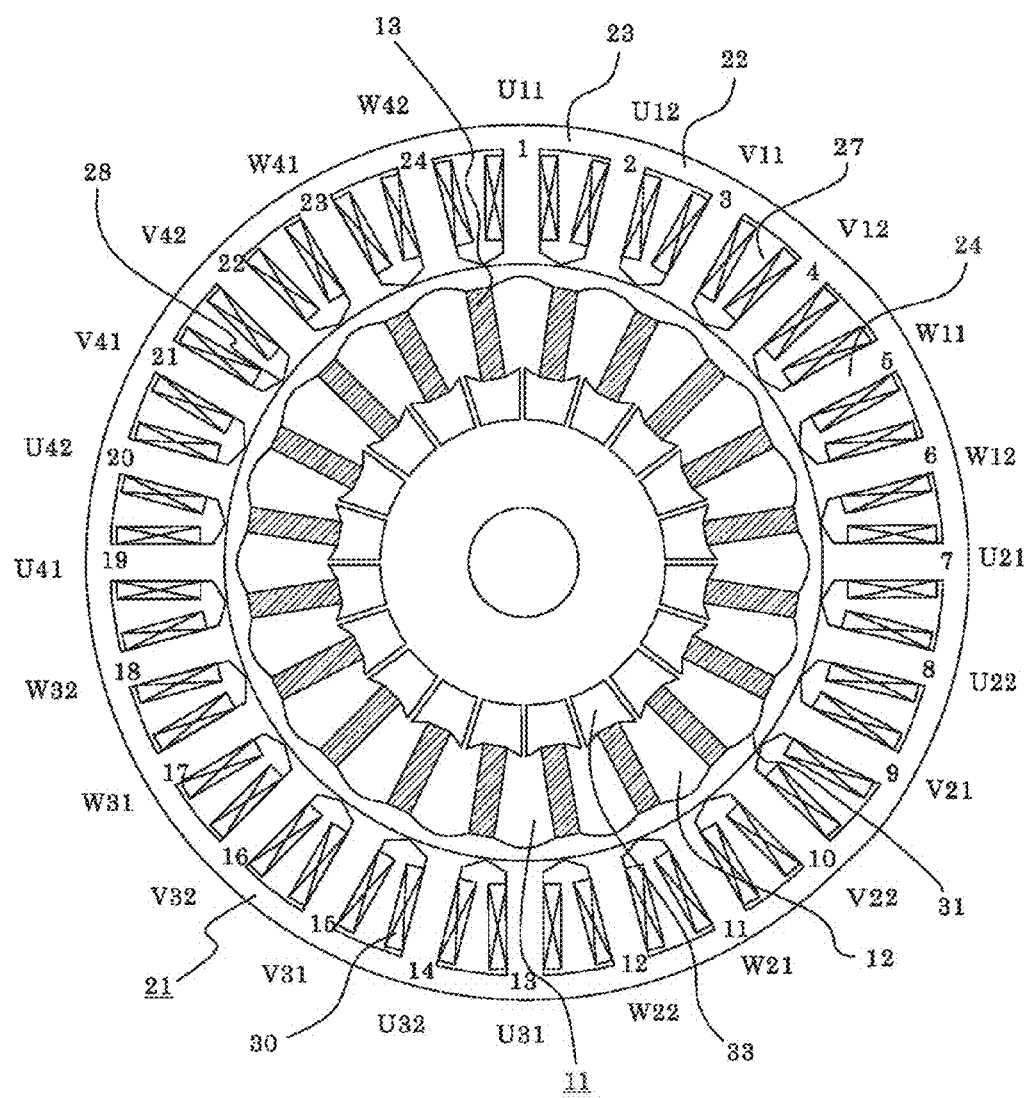
FIG. 3 is a sectional view showing a permanent magnet motor of embodiment 3 of the present invention.

FIG. 3 is a sectional view of a permanent magnet motor 10 of embodiment 3.

A rotor 11 is provided in a rotatable state inside a stator 21, and includes a shaft 14, a rotor iron core 12 provided outside the shaft 14, and twenty permanent magnets 13 provided at regular intervals around the outer circumference of the rotor iron core 12.

The stator 21 includes a ring-shaped core back 23, a total of twenty-four teeth 24 extending radially inward from the core back 23, a stator iron core 22 in which a slot 27 is provided between the adjacent two teeth 24, and an armature winding 30 wound on each tooth 24 in a concentrated manner.

It is noted that in FIG. 3, for the purpose of simplification, an insulator provided between the armature winding 30 and the stator iron core 22, and a frame provided on the outer circumference of the stator iron core 22 are not shown.

In addition, for convenience sake, numbers of 1 to 24 are assigned to the teeth 24. Further, for convenience sake, numbers are assigned to the armature windings (coils) wound on the respective teeth 24 in a concentrated manner, in order to identify three phases of U, V, and W of the coils.

The phases of U, V, and W include eight U phases of U11, U12, U21, U22, U31, U32, U41, and U42, eight V phases of V11, V12, V21, V22, V31, V32, V41, and V42, and eight W phases of W11, W12, W21, W22, W31, W32, W41, and W42. As shown in FIG. 3, the coils are arranged in the order, U11, U12, V11, V12, W11, W12, U21, U22, V21, V22, W21, W22, U31, U32, V31, V32, W31, W32, U41, U42, V41, V42, W41, and W42, which respectively correspond to the teeth 24-1 to 24-24.

In addition, regarding the winding directions of the coils, U11 and U12 are opposite to each other, U21 and U22 are opposite to each other, U31 and U32 are opposite to each other, and U41 and U42 are opposite to each other. The winding directions of the other phases V and W are also configured in the same manner.

These coils are connected in a Y-connection fashion or in a Δ-connection fashion to form two sets of three-phase armature windings 30.

Of the two sets of armature windings 30, a first armature winding 30-1 is composed of U11, U21, U31, U41, V11, V21, V31, V41, W11, W21, W31, and W41, and a second armature winding 30-2 is composed of U12, U22, U32, U42, V12, V22, V32, V42, W12, W22, W32, and W42.

In the configuration shown in FIG. 3, the length in the radial direction of the permanent magnet 13 of the rotor is longer than the length in the circumferential direction, and therefore magnetic flux can be concentrated on the rotor iron core 12, whereby high torque is obtained.

Conventionally, a structure in which the permanent magnet 13 is embedded in the rotor iron core 12 has a problem that an electromagnetic excitation force increases and vibration noise increases as compared to the case of surface magnet type. However, by driving the armature windings by the two three-phase inverters 102-1 and 102-2 shown in FIG. 4 such that the phase difference between the first armature winding 30-1 and the second armature winding 30-2 is an electric angle of 20° to 40°, or desirably, an electric angle of 30°, the 6-th order torque ripple can be reduced.

Further, the slot opening width Ws of the stator iron core 22 is set so as to satisfy Ws/(2πRs/Ns)≤0.15, where Rs is the inner radius of the stator iron core and Ns is the slot number of the stator iron core, thus making it possible to greatly reduce cogging torque whose order number coincides with Ns and reduce the 6-th order torque ripple even if magnetic saturation occurs in the stator iron core 22 due to flux leakage.

Further, in the case of 20 poles and 24 slots, a greatest common divisor P between M and Ns is four, which is a value equal to or greater than 3, where M is the pole number and Ns is the slot number.

In this case, an electromagnetic excitation force having a second spatial order can be reduced, whereby vibration and noise are reduced. That is, both increase in torque and reduction in vibration and noise can be realized. The same effect is obtained if P is equal to or greater than 3.

Besides the example shown in FIG. 3, if the pole number M is 12n±2n and the slot number Ns is 12n (n is an integer equal to or greater than 2), the same effect is obtained.

Embodiment 4

Figure 9:
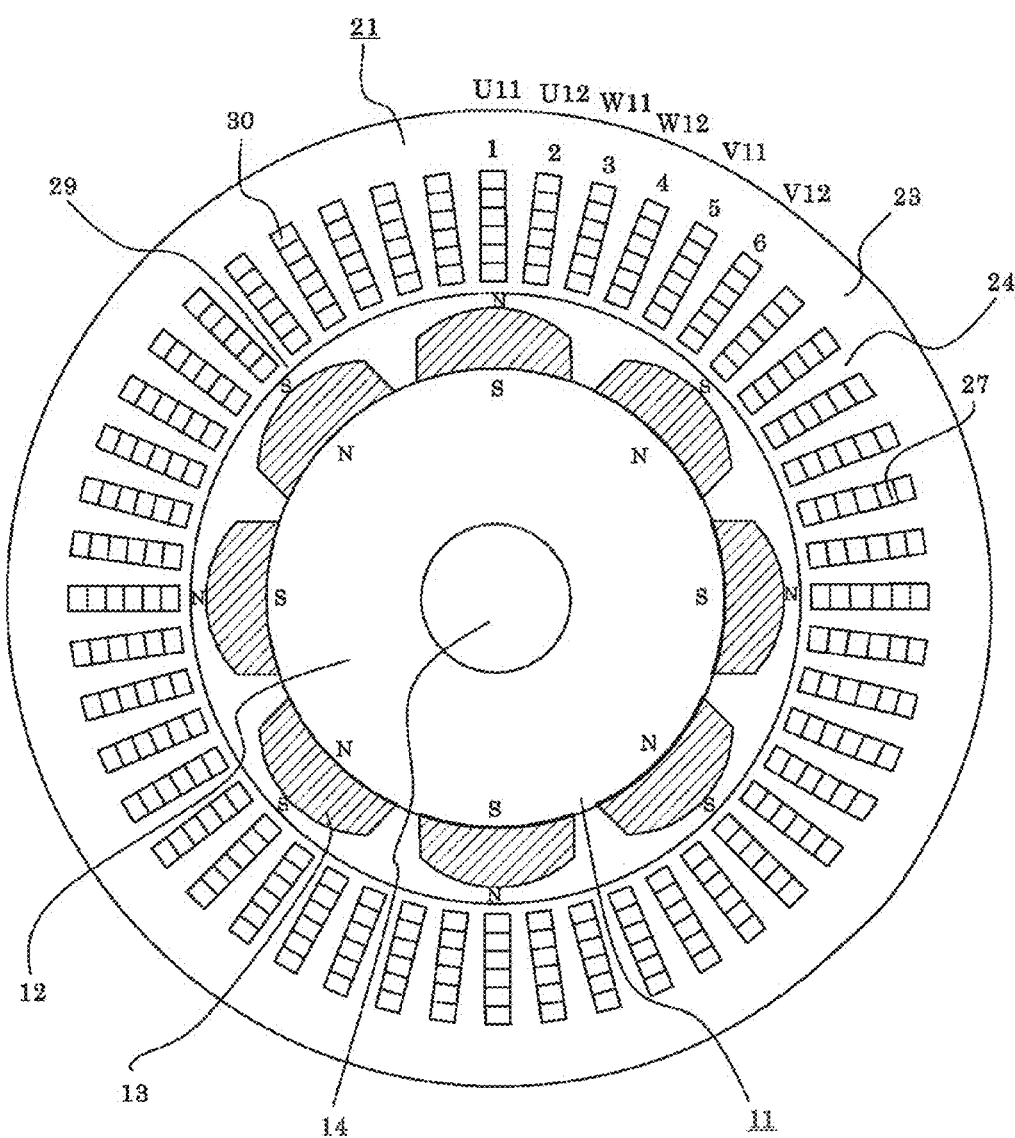
FIG. 9 is a sectional view showing a permanent magnet motor of embodiment 4 of the present invention.

FIG. 9 is a sectional view of a permanent magnet motor 10 of embodiment 4.

A rotor 11 is provided in a rotatable state inside a stator 21, and includes a shaft 14, a rotor iron core 12 provided outside the shaft 14, and eight permanent magnets 13 provided at regular intervals around the outer circumference of the rotor iron core 12.

The stator 21 includes a ring-shaped core back 23, a total of forty-eight teeth 24 extending radially inward from the core back 23, a stator iron core 22 in which a slot is provided between the adjacent two teeth 24, and an armature winding 30 wound on each slot 27 in a distributed manner.

In this example, the slot number for each pole for each phase is 2.

It is noted that in FIG. 9, for the purpose of simplification, an insulator provided between the armature winding 30 and the stator iron core 22, and a frame provided on the outer circumference of the stator iron core 22 are not shown.

In addition, for convenience sake, numbers of 1 to 6 are assigned to the slots 27.

Coils provided in the slots 27-1 to 27-6 are denoted by U11, U12, W11, W12, V11, and V12, respectively, and then clockwise, coils provided in the slots 27-7 to 27-12 are denoted by U21, U22, W21, W22, V21, and V22, respectively.

By generalization, numbers m, m+1, m+2, m+3, m+4, and m+5 of the slots 27 correspond to Um1, Um2, Wm1, Wm2, Vm1, and Vm2, respectively, where m represents an integer of 1 to 8.

Further, Um1, Vm1, and Wm1 form a first armature winding 30-1 for three phases of U1 phase, V1 phase, and W1 phase, and Um2, Vm2, and Wm2 form a second armature winding 30-2 for three phases of U2 phase, V2 phase, and W2 phase.

Figure 15:
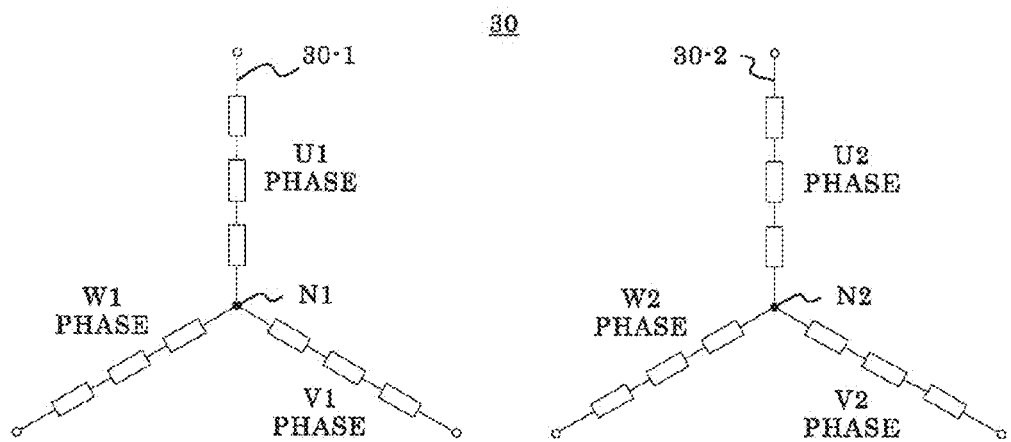
FIG. 15 is an explanation diagram showing a wire connection example of armature windings of the permanent magnet motor of embodiment 4.

As shown in FIG. 15, a pair of Y connections may be used or a pair of Δ connections may be used.

Further, the armature windings are driven by the two three-phase inverters 102-1 and 102-2 shown in FIG. 4 such that the phase difference between the first armature winding 30-1 and the second armature winding 30-2 is an electric angle of 20° to 40°, or desirably, an electric angle of 30°.

As shown in FIG. 9, the slots 27 of the stator iron core 22 have closed slot portions 29 at which the adjacent teeth 24 are completely joined with the iron core.

In this case, flux leakage occurs through a magnetic path between the adjacent teeth 24, and as a result, the magnetic flux density of the stator iron core 22 increases, whereby magnetic saturation occurs.

Conventionally, the 6-th order component of torque ripple increases due to this magnetic saturation, and therefore such a configuration makes the motor 10 unsuitable for an electric power steering apparatus. However, according to the configuration of the present embodiment, the armature windings are driven by the two three-phase inverters 102-1 and 102-2 such that the phase difference between the first armature winding 30-1 and the second armature winding 30-2 is an electric angle of 20° to 40°, or desirably, an electric angle of 30°. Therefore, the 6-th order component of torque ripple is greatly reduced.

Further, owing to the closed slot structure, influences of shape error on the rotor 11 side and variations in the shape and the magnetic characteristic of the permanent magnet 13 are decreased, whereby an effect of reducing cogging torque whose order number coincides with the slot number Ns is obtained.

Here, if the slot opening width Ws of the stator iron core 22 is set so as to satisfy Ws/(2πRs/Ns)≤0.15, where Rs is the inner radius of the stator iron core and Ns is the slot number of the stator iron core, substantially the same effect as in the case of closed slot is obtained.

Figure 10:
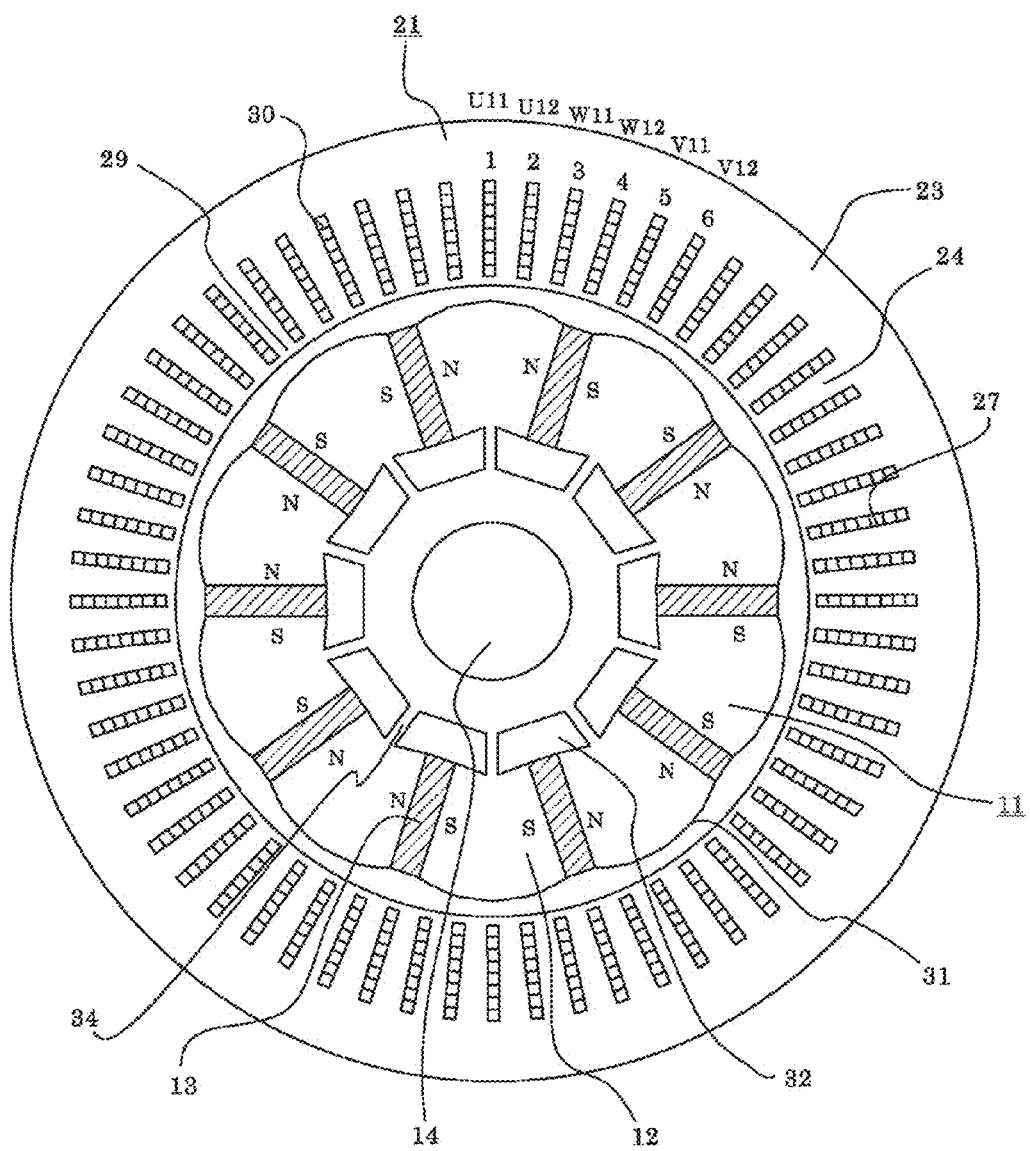
FIG. 10 is a sectional view showing another example of the permanent magnet motor of embodiment 4.

FIG. 10 is a sectional view of a permanent magnet motor 10 according to another example of the present embodiment.

In the motor 10, the pole number of the rotor 11 is and the slot number of the stator 21 is 60. The stator 21 includes a ring-shaped core back 23, a total of sixty teeth 24 extending radially inward from the core back 23, a stator iron core 22 in which a slot 27 is provided between the adjacent two teeth 24, and an armature winding 30 wound on each slot 27 in a distributed manner.

It is noted that in FIG. 10, for the purpose of simplification, an insulator provided between the armature winding 30 and the stator iron core 22, and a frame provided on the outer circumference of the stator iron core 22 are not shown.

In addition, for convenience sake, numbers of 1 to 6 are assigned to the slots 27.

Coils provided in the slots 27-1 to 27-6 are denoted by U11, U12, W11, W12, V11, and V12, respectively, and then clockwise, coils provided in the slots 27-7 to 27-12 are denoted by U21, U22, W21, W22, V21, and V22, respectively.

By generalization, numbers m, m+1, m+2, m+3, m+4, and m+5 of the slots 27 correspond to Um1, Um2, Wm1, Wm2, Vm1, and Vm2, respectively, where m represents an integer of 1 to 10.

Um1, Vm1, and Wm1 form a first armature winding 30-1 for three phases of U1 phase, V1 phase, and W1 phase, and Um2, Vm2, and Wm2 form a second armature winding 30-2 for three phases of U2 phase, V2 phase, and W2 phase.

As shown in FIG. 15, a pair of Y connections may be used or a pair of Δ connections may be used.

Further, the armature windings are driven by the two three-phase inverters 102-1 and 102-2 shown in FIG. 4 such that the phase difference between the first armature winding 30-1 and the second armature winding 30-2 is an electric angle of 20° to 40°, or desirably, an electric angle of 30°.

The rotor 11 is provided in a rotatable state inside the stator 21. The rotor 11 includes a shaft 14 as a rotary axis, and a rotor iron core 12 provided outside the shaft 14.

A permanent magnet 13 has a shape in which the length in the radial direction is longer than the length in the circumferential direction, and ten such permanent magnets 13 are arranged at regular intervals in the circumferential direction. The permanent magnets 13 are magnetized in directions shown in FIG. 10 in which N and S indicate N pole and S pole, respectively. That is, the permanent magnets 13 are magnetized such that surfaces facing to each other of the adjacent permanent magnets 13 have the same pole. By thus setting the magnetization directions, an effect of concentrating magnetic flux on the rotor iron core 12 and thereby increasing the magnetic flux density is obtained.

In addition, the rotor iron core 12 is interposed between the adjacent permanent magnets 13. The rotor iron core 12 has a curved surface portion 31 on its surface facing to the stator 21 side. The shape of the curved surface portion 31 is formed to be such a convex curved surface that the gap length from the stator 21 is shortened toward the midpoint between the adjacent permanent magnets.

This shape smoothens the waveform of the magnetic flux density occurring in the gap, thereby reducing cogging torque and torque ripple.

Further, a non-magnetic portion 32 is provided in contact with an end surface of the permanent magnet 13 on the inner circumferential side. This portion may be air or may be filled with resin, or a non-magnetic metal such as stainless or aluminum may be interposed in this part.

Thus, flux leakage of the permanent magnet 13 can be reduced.

A joint portion 34 is provided between the rotor iron core 12 between the adjacent permanent magnets 13 and the rotor iron core 12 provided so as to surround the outer circumference of the shaft 14. The joint portion 34 functions to mechanically join both rotor iron cores 12.

As shown in FIG. 10, the slots 27 of the stator iron core 22 have closed slot portions 29 at which the adjacent teeth 24 are completely joined with the iron core.

In this case, flux leakage occurs through a magnetic path between the adjacent teeth 24, and as a result, the magnetic flux density of the stator iron core 22 increases, whereby magnetic saturation occurs.

Conventionally, the 6-th order component of torque ripple increases due to this magnetic saturation, and therefore such a configuration makes the motor 10 unsuitable for an electric power steering apparatus. However, according to the configuration of the present embodiment, the armature windings are driven by the two three-phase inverters 102-1 and 102-2 as shown in FIG. 4 such that the phase difference between the first armature winding 30-1 and the second armature winding 30-2 is an electric angle of 20° to 40°, or desirably, an electric angle of 30°. Therefore, the 6-th order component of torque ripple is greatly reduced.

Further, owing to the closed tooth structure, influences of shape error on the rotor 11 side and variations in the shape and the magnetic characteristic of the permanent magnet 13 are decreased, whereby an effect of reducing cogging torque whose order number coincides with the slot number Ns is obtained.

Here, if the slot opening width Ws of the stator iron core 22 is set so as to satisfy Ws/(2πRs/Ns)≤0.15, where Rs is the inner radius of the stator iron core and Ns is the slot number of the stator iron core, substantially the same effect as in the case of closed slot is obtained.

In FIG. 10, since the length in the radial direction is longer than the length in the circumferential direction, magnetic flux is concentrated on the rotor iron core 12, whereby high torque is obtained.

Conventionally, a structure in which the permanent magnet 13 is embedded in the rotor iron core 12 has a problem that torque ripple increases and vibration noise increases as compared to the case of surface magnet type. However, by configuring the wire connections of the armature windings 30 as shown in FIG. 15, and further, by driving the armature windings by the two three-phase inverters 102-1 and 102-2 shown in FIG. 4 such that the phase difference between the first armature winding 30-1 and the second armature winding 30-2 is an electric angle of 20° to 40°, or desirably, an electric angle of 30°, the 6-th order torque ripple can be reduced.

Although the case where the slot number for each pole for each phase is 2 has been shown, if the slot number is an even number equal to or greater than 2, the armature windings 30 can be configured in the same manner, and therefore the same effect is obtained.

Embodiment 5

Figure 11:
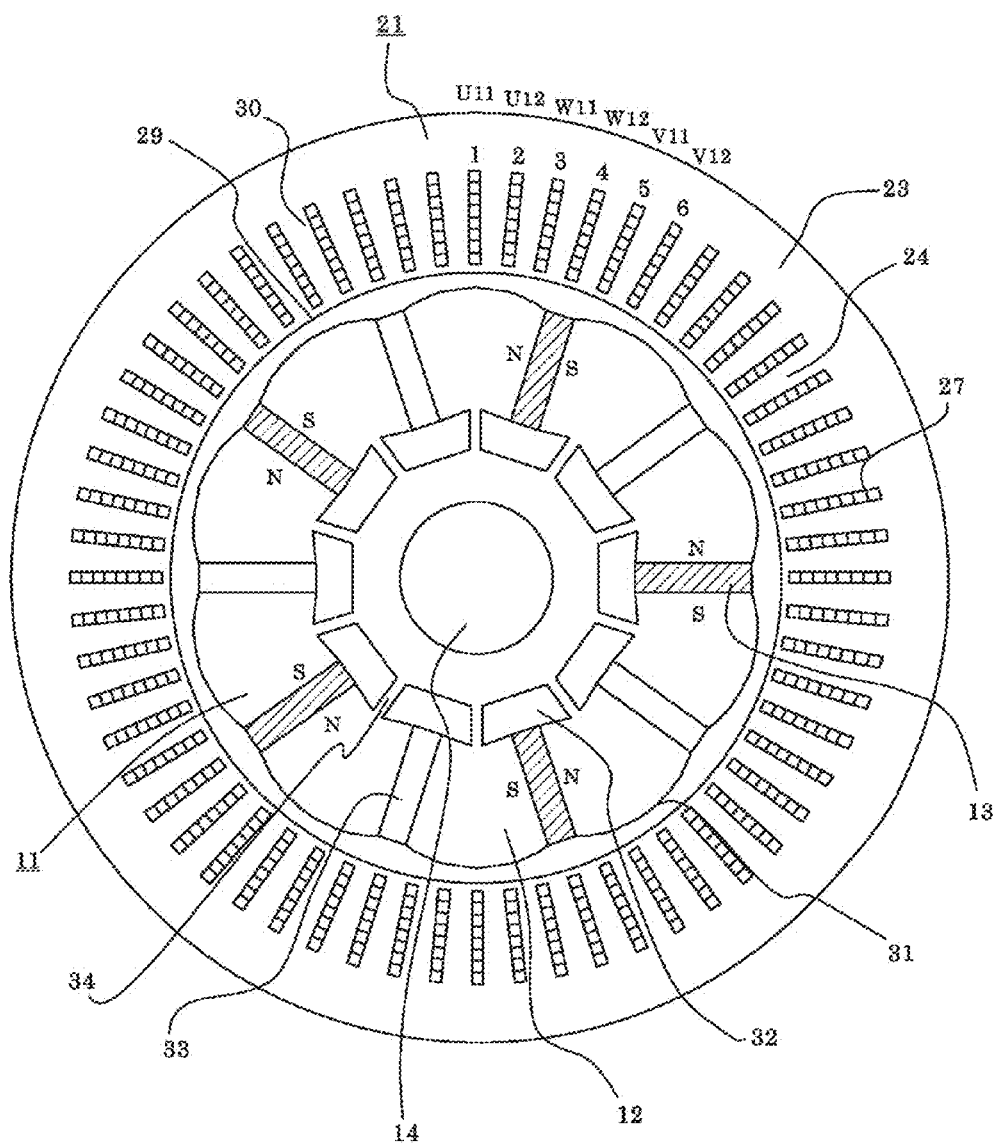
FIG. 11 is a sectional view showing a permanent magnet motor of embodiment 5 of the present invention.

FIG. 11 shows another example of the permanent magnet motor 10 of embodiment 4 shown in FIG. 10, in which the placement of the permanent magnet 13 of the rotor 11 is different.

The structure of the stator 21 is the same as in FIG. 10. The rotor 11 is provided in a rotatable state inside the stator 21.

The rotor 11 includes a shaft 14 as a rotary axis, and a rotor iron core 12 provided outside the shaft 14.

The permanent magnet 13 has a shape in which the length in the radial direction is longer than the length in the circumferential direction, and five such permanent magnets 13 are arranged at regular intervals in the circumferential direction.

The permanent magnets 13 are magnetized in directions shown in FIG. 11 in which N and S indicate N pole and S pole, respectively. That is, the permanent magnets 13 are magnetized such that surfaces facing to each other of the adjacent permanent magnets 13 have different poles.

Further, a non-magnetic portion 32 is provided between the adjacent permanent magnets 13. This portion may be air or may be filled with resin, or a non-magnetic metal such as stainless or aluminum may be interposed in this part.

By setting the magnetization directions as described above and providing the non-magnetic portions 32, an effect of concentrating magnetic flux on the rotor iron core 12 and thereby increasing the magnetic flux density is obtained.

In addition, rotor iron cores 12 are provided on both sides in the circumferential direction of the permanent magnet 13.

The rotor iron core 12 has a curved surface portion 31 on its surface facing to the stator 21 side. The shape of the curved surface portion 31 is formed to be such a convex curved surface that the gap length from the stator 21 is shortened toward the midpoint between the adjacent permanent magnets.

This shape smoothens the waveform of the magnetic flux density occurring in the gap, thereby reducing cogging torque and torque ripple.

Further, non-magnetic portions 33 are provided in contact with end surfaces of the permanent magnet 13 and a non-magnetic portion 29 on the inner circumferential side. This portion may be air or may be filled with resin, or a non-magnetic metal such as stainless or aluminum may be interposed in this part.

Thus, flux leakage of the permanent magnet 13 can be reduced.

A joint portion 34 is provided between the rotor iron core 12 between the adjacent permanent magnets 13 and the rotor iron core 12 provided so as to surround the outer circumference of the shaft 14. The joint portion 34 functions to mechanically join both rotor iron cores 12.

Such a structure of the rotor 11 conventionally has a problem that, since the number of the permanent magnets 13 is reduced by half, distribution of the magnetic flux density is uneven as compared to the structure of the rotor 11 shown in FIG. 10, resulting in increase in torque ripple.

Besides, since the stator iron core 22 has the closed slot portion 29, there is a problem that increase in the torque ripple is also caused by magnetic saturation of the iron core due to flux leakage between the teeth 24.

However, according to the configuration of the present embodiment, the armature windings are driven by the two three-phase inverters 102-1 and 102-2 as shown in FIG. 4 such that the phase difference between the first armature winding 30-1 and the second armature winding 30-2 is an electric angle of 20° to 40°, or desirably, an electric angle of 30°. Therefore, the 6-th order component of torque ripple is greatly reduced.

Further, owing to the closed slot structure, influences of shape error on the rotor 11 side and variations in the shape and the magnetic characteristic of the permanent magnet 13 are decreased, whereby an effect of reducing cogging torque whose order number coincides with the slot number Ns is obtained.

Here, if the slot opening width Ws of the stator iron core 22 is set so as to satisfy Ws/(2πRs/Ns)≤0.15, where Rs is the inner radius of the stator iron core and Ns is the slot number of the stator iron core, substantially the same effect as in the case of closed slot is obtained.

In FIG. 11, since the length in the radial direction is longer than the length in the circumferential direction, magnetic flux is concentrated on the rotor iron core 12, whereby high torque is obtained.

Conventionally, a structure in which the permanent magnet 13 is embedded in the rotor iron core 12 has a problem that torque ripple increases and vibration noise increases as compared to the case of surface magnet type. However, by configuring the wire connections of the armature windings 30 as shown in FIG. 15, and further, by driving the armature windings by the two three-phase inverters 102-1 and 102-2 shown in FIG. 4 such that the phase difference between the first armature winding 30-1 and the second armature winding 30-2 is an electric angle of 20° to 40°, or desirably, an electric angle of 30°, the 6-th order torque ripple can be reduced.

Further, although the amount of the permanent magnets 13 in FIG. 11 is reduced by half as compared to that in FIG. 10, torque is not reduced by half. That is, magnet usage efficiency is improved and torque and output per unit magnet amount increases, whereby the cost of the motor 10 can be reduced.

Generally, when the pole number of the stator 21 is M, if M/2 number of permanent magnets 13 are arranged in the circumferential direction in the rotor 11, the above effect is obtained.

Particularly, in the case of using a neodymium-based magnet, particularly, dysprosium, for the permanent magnet 13, the effect of reducing the cost is very large.

Figure 16:
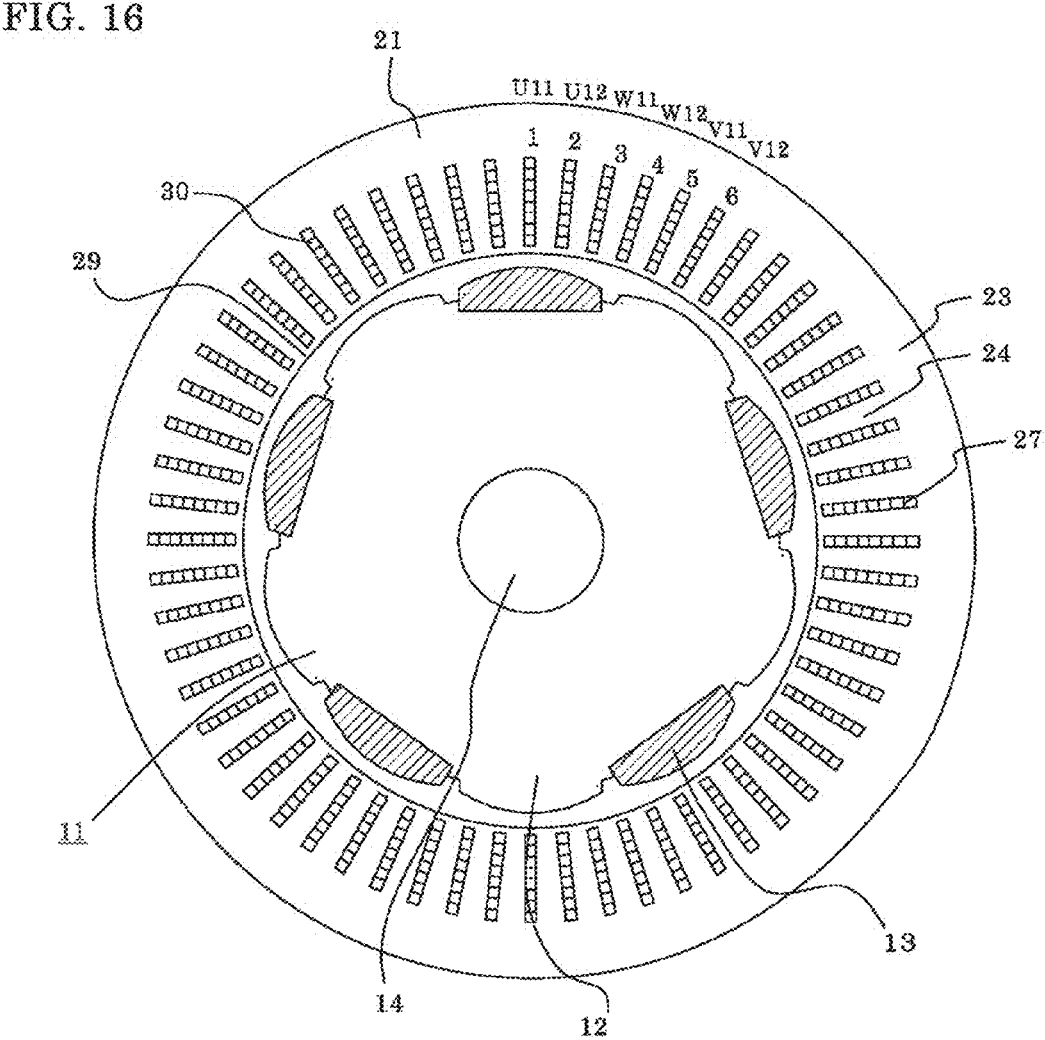
FIG. 16 is a sectional view showing another example of the permanent magnet motor of embodiment 5.

Although an example where the permanent magnets 13 are embedded in the rotor iron core 12 has been shown in FIG. 11, the permanent magnets 13 may be provided on a surface of the rotor iron core 12 as shown in FIG. 16.

Although the case where the slot number for each pole for each phase is 2 has been shown in FIGS. 11 and 16, if the slot number is an even number equal to or greater than 2, the armature windings 30 can be configured in the same manner, and therefore the same effect is obtained.

Embodiment 6

Figure 17:
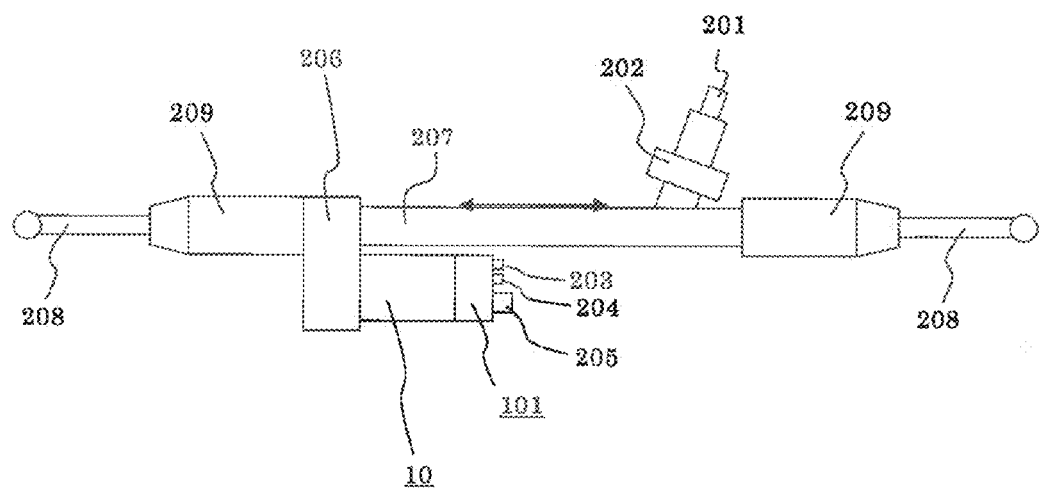
FIG. 17 is a schematic configuration diagram showing an electric power steering apparatus of embodiment 6 of the present invention.

FIG. 17 is an explanation diagram of an electric power steering apparatus of an automobile.

A driver steers a steering wheel (not shown), and the resultant torque is transmitted to a shaft 201 via a steering shaft (not shown).

At this time, the torque detected by a torque sensor 202 is converted into an electric signal and then the electric signal is transmitted through a cable (not shown) to an ECU 101 (control unit) via a connector 203.

Meanwhile, information about the automobile such as the velocity thereof is converted into an electric signal and then the electric signal is transmitted to the ECU 101 via the connector 204. The ECU 101 calculates required assist torque from the above torque and the information about the automobile such as the velocity thereof, and thereby supplies current to a permanent magnet motor 10 through inverters 102-1 and 102-2 as shown in FIG. 4. The motor 10 is provided in parallel to the movement direction (indicated by an arrow) of a rack shaft.

In addition, power is supplied from a battery or an alternator to the ECU 101 via a power supply connector 205. Torque generated by the permanent magnet motor 10 is decelerated by a gear box 206 containing a belt (not shown) and a ball screw (not shown), and generates thrust for moving the rack shaft (not shown) provided inside a housing 207 in the direction of the arrow, thereby assisting a steering force for the driver.

As a result, a tie rod 208 is moved and a wheel is turned, whereby the automobile can be turned.

Owing to the assist by the torque of the permanent magnet motor 10, the driver can turn the automobile with a less steering force.

It is noted that a rack boot 209 is provided for preventing a foreign material from entering the inside of the apparatus.

In such electric power steering apparatuses, since cogging torque and torque ripple caused by the motor 10 are transmitted to a driver via a gear, it is desirable that the cogging torque and torque ripple are small in order to obtain a preferable steering feeling.

In addition, it is also desirable that vibration and noise upon operation of the motor 10 are small.

Considering the above, by applying the motors 10 described in embodiments 1 to 5, the effects described in these embodiments can be obtained.

Particularly, an electromagnetic excitation force having a second spatial order can be reduced, whereby vibration and noise are reduced. Further, an effect of realizing both increase in torque and reduction in vibration and noise is obtained.

As shown in FIG. 17, the motor 10 is provided in parallel to the movement direction (indicated by the arrow) of the rack shaft. Although an electric power steering apparatus is a system suitable to a large vehicle, output of the motor 10 needs be increased, and therefore, conventionally, there is a problem that vibration and noise due to the motor 10 also increase along with the increase in the output.

However, by applying the motors 10 described in embodiments 1 to 6, an effect of solving such a problem and allowing the electric power steering apparatus to be applied also to a large vehicle, thereby reducing fuel efficiency, is obtained.

It is noted that, within the scope of the present invention, the above embodiments may be freely combined with each other, or each of the above embodiments may be modified or abbreviated as appropriate.

DESCRIPTION OF THE REFERENCE CHARACTERS

10 motor
11 rotor
12 rotor iron core
13 permanent magnet
14 shaft
21 stator
22 stator iron core
23 core back
24 tooth
26 tooth end portion
27 slot
28 slot opening portion
29 closed slot portion
30 armature winding
30-1 first armature winding
30-2 second armature winding
31 curved surface portion
32 non-magnetic portion
33 non-magnetic portion
34 joint portion
35 frame
36 magnetic path
37 insulator
38 joint surface
101 ECU
102 inverter
102-1 first inverter
102-2 second inverter
103 power supply
104 coil
105 power supply relay
105-1 first power supply relay
105-2 second power supply relay
106-1 capacitor
106-2 capacitor
107-1 to 6 MOS-FET
108-1 to 6 MOS-FET
109-1 to 3 shunt
110-1 to 3 shunt
111 rotation angle sensor
201 shaft
202 torque sensor
203 connector
204 connector
205 power supply connector
206 gear box
207 housing
208 tie rod
209 rack boot

The invention claimed is:

1. A permanent magnet motor comprising:
a rotor including a rotor iron core and a plurality of permanent magnets provided to the rotor iron core; and
a stator including a stator iron core having a plurality of teeth, and two sets of three-phase armature windings provided in a plurality of slots formed in the stator iron core, a first armature winding being supplied with current from a first inverter and a second armature winding being supplied with current from a second inverter, wherein
in the case where the two sets of three-phase armature windings are defined such that the first armature winding corresponds to U1 phase, V1 phase, and W1 phase and the second armature winding corresponds to U2 phase, V2 phase, and W2 phase, the U1 phase of the first armature winding is provided in both slots of any one pair of adjacent slots of the plurality of slots, or at least one of the U1 phase of the first armature winding and the U2 phase of the second armature winding is provided in one slot of any one pair of adjacent slots of the plurality of slots,
the U1 phase, the V1 phase, and the W1 phase of the first armature winding are shifted by an electric angle of 20° to 40° from the U2 phase, the V2 phase, and the W2 phase of the second armature winding upon driving, and
a slot opening width Ws of the stator iron core is set so as to satisfy $Ws/(2\pi Rs/Ns) \leq 0.15$, where Rs is an inner radius of the stator iron core and Ns is a slot number of the stator iron core, and
a core back thickness Wc of the stator iron core is set so as to satisfy $0.18 \leq Wc/(2\pi Rs/M) \leq 0.50$, where M is a pole number of the rotor,
whereby cogging torque whose order number coincides with the slot number Ns and a 6-th order component of torque ripple are reduced.

2. The permanent magnet motor according to claim 1, wherein
the winding for U1 phase of the first armature winding is wound on one tooth of any one pair of adjacent teeth of the plurality of teeth, and the winding for U2 phase of the second armature winding is wound on the other tooth,
the winding for V1 phase of the first armature winding is wound on one tooth of another pair of adjacent teeth of the plurality of teeth, and the winding for V2 phase of the second armature winding is wound on the other tooth, and
the winding for W1 phase of the first armature winding is wound on one tooth of still another pair of adjacent teeth of the plurality of teeth, and the winding for W2 phase of the second armature winding is wound on the other tooth.

3. The permanent magnet motor according to claim 1, wherein ends of adjacent teeth of the stator iron core are connected with each other.

4. The permanent magnet motor according to claim 1, wherein
a greatest common divisor P between M and Ns is three or greater, where M is the pole number of the rotor and Ns is the slot number of the stator iron core.

5. The permanent magnet motor according to claim 1, wherein
$M=18n\pm 4n$ and $Ns=18n$ (n is an integer) are satisfied, where M is the pole number of the rotor and Ns is the slot number of the stator iron core.

6. The permanent magnet motor according to claim 1, wherein
$M=12n\pm 2n$ and $Ns=12n$ (n is an integer) are satisfied, where M is the pole number of the rotor and Ns is the slot number of the stator iron core.

7. The permanent magnet motor according to claim 1, wherein
the slot opening width Ws is smaller than a wire diameter of the armature windings.

8. The permanent magnet motor according to claim 1, wherein
the permanent magnets are embedded in the rotor iron core, and the length in a radius direction of each permanent magnet is longer than the length in a circumferential direction.

9. The permanent magnet motor according to claim 1, wherein
the permanent magnets have a cross-sectional shape of rectangle, and the length in a radius direction of each permanent magnet is longer than the length in a circumferential direction,
the magnetization directions of the permanent magnets are set such that surfaces facing to each other of the adjacent permanent magnets have the same pole,
the rotor iron core is interposed between the adjacent permanent magnets and has a curved surface portion on a surface thereof facing to the stator side, the shape of the curved surface portion being formed to be such a convex curved surface that a gap length from the stator is shortened toward a midpoint between the adjacent permanent magnets, and
a non-magnetic portion is provided in contact with an end surface of each permanent magnet on an inner circumferential side.

10. The permanent magnet motor according to claim 1, wherein
the permanent magnets of the rotor are arranged in the circumferential direction, the number of the permanent magnets being M/2, where M is the pole number of the stator.

11. The permanent magnet motor according to claim 10, wherein
the permanent magnets are embedded in the rotor iron core, and the length in a radius direction of each permanent magnet is longer than the length in a circumferential direction,
a non-magnetic portion is provided on the inner circumferential side of each permanent magnet, and
a non-magnetic portion is provided between the adjacent permanent magnets.

12. The permanent magnet motor according to claim 1, wherein
the armature windings of the stator are wound in a distributed manner, and
the slot number for each pole for each phase is an even number equal to or greater than 2.

13. The permanent magnet motor according to claim 1, the permanent magnet motor being provided in parallel to a movement direction of a rack shaft of an electric power steering apparatus.

* * * * *